United States Patent [19]

Sano

[11] Patent Number: 5,425,574
[45] Date of Patent: Jun. 20, 1995

[54] ANTI-SKID BRAKING METHOD AND SYSTEM

[75] Inventor: Yoshiaki Sano, Okazaki, Japan

[73] Assignee: Mitsubishi Jidosha Kogyo Kabushiki Kaisha, Tokyo, Japan

[21] Appl. No.: 103,779

[22] Filed: Aug. 10, 1993

[30] Foreign Application Priority Data

Aug. 19, 1992 [JP] Japan .................. 4-220520

[51] Int. Cl.⁶ .............................. B60T 8/00
[52] U.S. Cl. ........................ 303/97; 303/100; 303/107
[58] Field of Search ................. 303/93–95, 303/97, 100, 103, 105, 106, 109, 113.5, 111, 24.1; 180/197; 364/426.02, 426.03, 426.01

[56] References Cited

U.S. PATENT DOCUMENTS

| 3,544,172 | 12/1970 | Howard et al. | 303/92 |
|---|---|---|---|
| 3,717,384 | 2/1973 | Harned | 303/107 X |
| 3,727,992 | 4/1973 | Bowler et al. | 303/107 |
| 5,040,120 | 8/1991 | Hoffmann | 303/103 X |

FOREIGN PATENT DOCUMENTS

| 60-107440 | 6/1985 | Japan . | |
|---|---|---|---|
| 64-21056 | 2/1989 | Japan . | |
| 37648 | 1/1991 | Japan . | |
| 4166464 | 6/1992 | Japan | 303/104 |
| 2162262 | 1/1986 | United Kingdom | 303/104 |

Primary Examiner—Robert J. Oberleitner
Assistant Examiner—Peter M. Poon
Attorney, Agent, or Firm—Evenson, McKeown, Edwards & Lenahan

[57] ABSTRACT

An anti-skid braking method is provided for controlling braking force to be applied to a wheel of an automotive vehicle by detecting any wheel behavior that the wheel is about to lock. The method comprises the following steps: detecting a vertical acceleration of a vehicle body of the automotive vehicle; detecting a longitudinal acceleration of the vehicle body; reducing a value, which corresponds to the vertical acceleration, when the longitudinal acceleration falls into a range not smaller than a first predetermined value, whereby a correction value is computed; and lowering sensitivity, at which the braking force is to be reduced in response to the wheel behavior, in accordance with an increase in the correction value computed in the correction value computing step. The longitudinal acceleration detection step may detect accelerations of left and right wheels, and the correction value computing step may include a step of selecting, as the wheel acceleration to be subjected to the processing, the greater one of the accelerations of the left and right wheels detected above. An anti-skid braking system suitable for use in practicing the anti-skid braking method is also described.

34 Claims, 16 Drawing Sheets

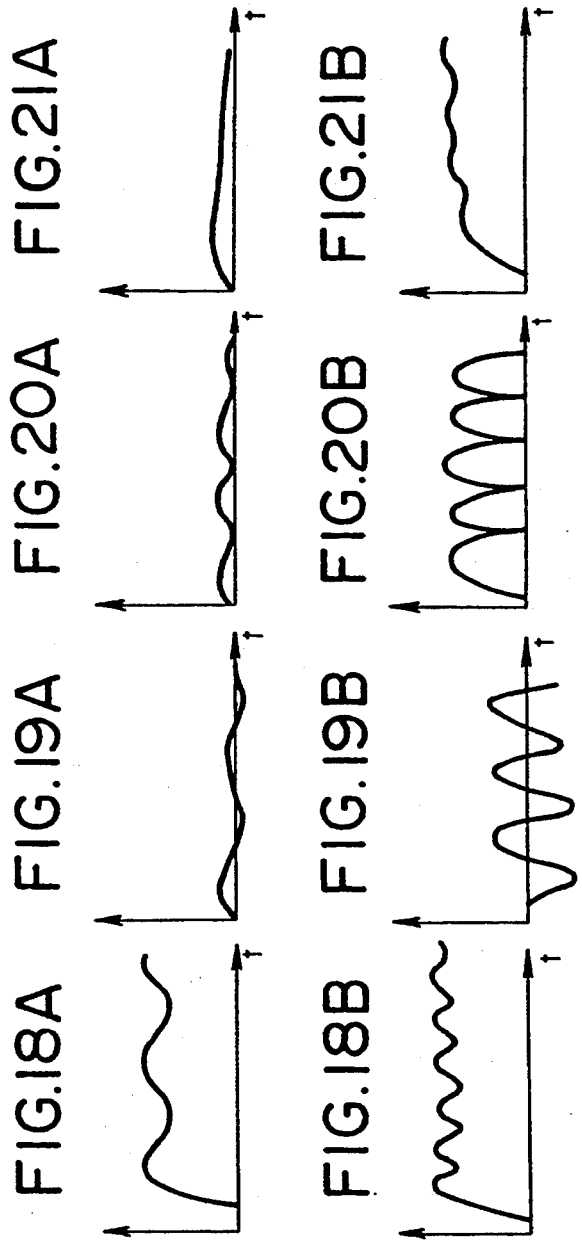

ANTI-SKID BRAKING METHOD AND SYSTEM

BACKGROUND OF THE INVENTION a) Field of the Invention

This invention relates to an anti-skid braking method suited for application to brakes of an automotive vehicle, and especially to an anti-skid braking method which assures proper control of braking force during running on a rough road. This invention is also concerned with an anti-skid braking system suited for the practice of the anti-skid braking method.

b) Description of the Related Art

An anti-skid braking method is known, which upon braking on a low-μ road such as a rain-wet road, can prevent slipping of wheels, retain steerability and allow a vehicle to stop in a short stopping distance. According to this braking method, the revolution speed of each wheel is detected to determine the speed of the wheel. Based on the difference between the speed of the wheel and a reference speed of the vehicle body, the slip ratio of the wheel is determined. Braking pressure for the wheel is then increased or decreased so that the slip ratio can be maintained near an optimal slip ratio at which the coefficient of friction of the wheel becomes the greatest.

When a vehicle is running on a rough road, it is necessary to control braking pressure in accordance with the roughness of the road. According to the conventional anti-skid braking method, a wheel acceleration (i.e., a vibration component of a wheel speed) is detected. Depending on the magnitude of the vibration component, it is then determined whether a road on which a vehicle is running is rough. When the road is determined to be rough, rough road correction of a slip ratio is then conducted.

When detection of a rough road is effected directly from a vibration component of a wheel speed as described above, the vibration component of the wheel speed may not always adequately reflect the roughness because the vibration component itself is obtained as a result of the anti-skid brake control. Especially, when the slip ratio of each front wheel is increased to 100% upon detection of a rough road with a view to improving the braking force, the wheel speed drops to zero (0) thereby making it no longer possible to detect any rough road.

SUMMARY OF THE INVENTION

With a view to overcoming the foregoing inconvenience, the present invention has as an object the provision of an anti-skid braking method and an anti-skid braking system, which can accurately detect a rough road under all circumstances and can improve braking force on the rough road.

To attain the above-described object, the present invention provides, in a first aspect thereof, an anti-skid braking method for controlling braking force to be applied to a wheel of an automotive vehicle by detecting any wheel behavior that the wheel is about to lock, which comprises the following steps:

detecting a vertical acceleration of a vehicle body of the automotive vehicle;

detecting a longitudinal acceleration of the vehicle body;

reducing a value, which corresponds to the vertical acceleration detected in the vertical acceleration detection step, when the longitudinal acceleration falls into a range not smaller than a first predetermined value, whereby a correction value is computed; and lowering sensitivity, at which the braking force is to be reduced in response to the wheel behavior, in accordance with an increase in the correction value computed in the correction value computing step.

Although a rough road can be detected to a certain extent depending upon a vertical acceleration of the vehicle body, a large longitudinal acceleration even when the vertical acceleration is large indicates a road surface permitting sufficient deceleration or acceleration so that it is unnecessary to specifically perform rough road control. According to the present invention, the sensitivity at which the braking force is reduced in response to any wheel behavior that the wheel is about to lock is therefore reduced in accordance with an increase in the correction value obtained 10 by reducing a value, which corresponds to the vertical acceleration, when the longitudinal acceleration falls in the range of from the first predetermined value and up. As a consequence, the correction value for the determination of a rough road becomes smaller on a road surface capable of providing a large longitudinal acceleration even if the vertical acceleration is large. Accuracy of control on a rough road can thus be improved.

As a preferred embodiment of the first aspect of the present invention, the value corresponding to the vertical acceleration is reduced in the correction value computing step even when the longitudinal acceleration falls into another range not greater than a second predetermined value which is smaller than the first predetermined value. This makes it possible to further improve the accuracy of control on a rough road, because a longitudinal acceleration is also induced to a certain extent whenever a vertical acceleration is produced by running on a rough road.

As another preferred embodiment of the present invention, the correction value computing step includes a step of increasing the correction value when the automotive vehicle is running at a low speed. This makes it possible to effectively reflect the fact that an automotive vehicle is often running at a low speed when running on a rough road.

In a second aspect of the present, there is also provided an anti-skid braking method for controlling braking force to be applied to a wheel of an automotive vehicle by detecting any wheel behavior that the wheel is about to lock, which comprises the following steps:

detecting a vertical acceleration of a vehicle body of the automotive vehicle;

detecting any acceleration of the wheel;

reducing a value, which corresponds to the vertical acceleration detected in the vertical acceleration detection step, when the wheel acceleration falls into a range not greater than a first predetermined value, whereby a correction value is computed; and lowering sensitivity, at which the braking force is reduced in response to the wheel behavior, in accordance with an increase in the correction value computed in the correction value computing step.

Although a rough road can be detected to a certain extent depending upon a vertical acceleration of the vehicle body, a small wheel acceleration even when the vertical acceleration is large indicates that the possibility of actually running on a rough road is low. According to the present invention, the sensitivity at which the braking force is reduced response to any wheel behavior that the wheel is about to lock is therefore reduced in accordance with an increase in the correction value obtained by reducing a value, which corresponds to the vertical acceleration, when the wheel acceleration falls into the range not greater than the first predetermined value. As a consequence, the correction value for the determination of a rough road becomes smaller on a road surface capable of providing a large longitudinal acceleration even if the vertical acceleration is large. The accuracy of control on a rough road can be improved accordingly.

As a preferred embodiment of the second aspect of the present invention, the correction value computing step includes a step of increasing the correction value when the automotive vehicle is running at a low speed. This makes it possible to effectively reflect the fact that an automotive vehicle is often running at a low speed when running on a rough road.

As a preferred embodiment common to the first and second aspects of the present invention, it is possible to effectively use a longitudinal acceleration sensor, which is often arranged for setting a simulated vehicle body speed for an anti-skid brake, by detecting a longitudinal acceleration of the vehicle body and detecting a vertical acceleration of the vehicle body from a high-frequency component of the longitudinal acceleration in the correction value computing step.

As another preferred embodiment common to the first and second aspects of the present invention, an additional step is included to detect that the automotive vehicle is turning, and the sensitivity lowering step includes a step of inhibiting the execution of the processing of the sensitivity lowering step while the automotive vehicle is turning. This can prevent a reduction in the turning performance of the automotive vehicle.

As a further preferred embodiment common to the first and second aspects of the present invention, the sensitivity lowering step includes a step of limiting a reduction in the sensitivity for a rear wheel relative to a reduction in the sensitivity for a front wheel. This makes it possible to improve the braking performance on a rough road while fully maintaining the directional stability of the vehicle.

As a system suitable for the practice of the anti-skid braking method according to the first aspect of this invention, the present invention also provides as a third aspect an anti-skid braking system for controlling braking force to be applied to a wheel of an automotive vehicle by detecting any wheel behavior that the wheel is about to lock, which comprises:

means for detecting a vertical acceleration of a vehicle body of the automotive vehicle;

means for detecting a longitudinal acceleration of the vehicle body;

means for reducing a value, which corresponds to the vertical acceleration detected by the vertical acceleration detection means, when the longitudinal acceleration detected by the longitudinal acceleration detecting means falls into a range not smaller than a first predetermined value, whereby a correction value is computed; and means for lowering sensitivity, at which the braking force is to be reduced in response to the wheel behavior, in accordance with an increase in the correction value computed by the correction value computing means.

As a system suitable for the practice of the anti-skid braking method according to the second aspect of this invention, the present invention also provides as a fourth aspect an anti-skid braking system for controlling braking force to be applied to a wheel of an automotive vehicle by detecting any wheel behavior that the wheel is about to lock, which comprises:

means for detecting a vertical acceleration of a vehicle body of the automotive vehicle;

means for detecting any acceleration of the wheel;

means for reducing a value, which corresponds to the vertical acceleration detected by the vertical acceleration detection means, when the wheel acceleration detected by the wheel acceleration detecting means falls into a range not greater than a first predetermined value, whereby a correction value is computed; and means for lowering sensitivity, at which the braking force is reduced in response to the wheel behavior, in accordance with an increase in the correction value computed by the correction value computing means.

Other features of the present invention will become apparent from the following description.

BRIEF DESCRIPTION OF THE DRAWINGS

FIGS. 18A and 18B through FIGS. 21A and 21B are graphs illustrating the waveforms of signals at respective points in the functional block diagram;

DETAILED DESCRIPTION OF THE INVENTION AND PREFERRED EMBODIMENT

One embodiment of the present invention will hereinafter be described with reference to the accompanying drawings.

System Outline

Figure 1:
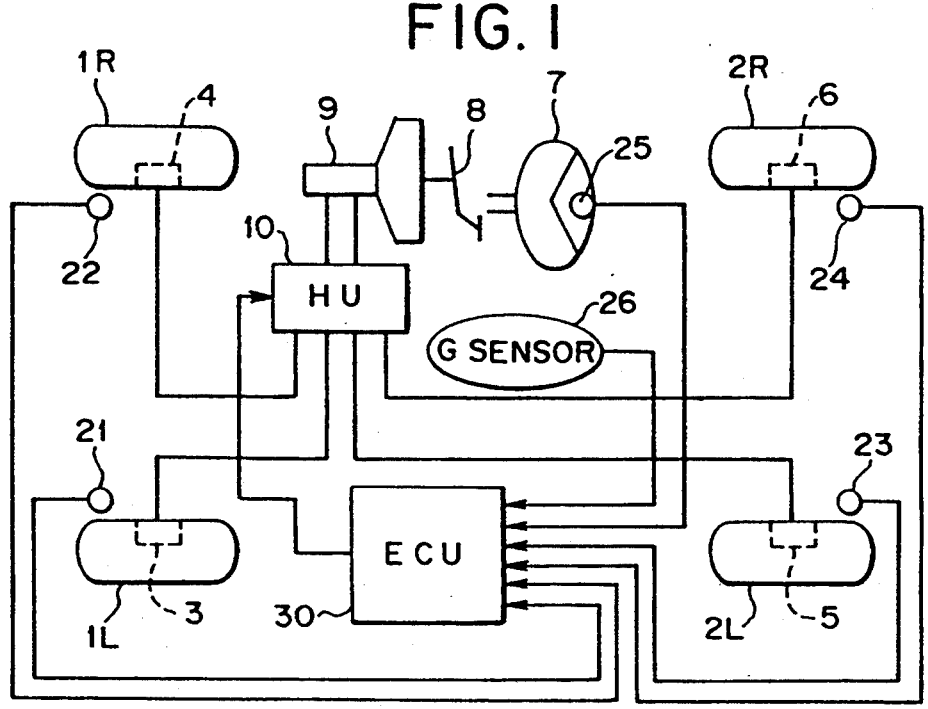
FIG. 1 is a block diagram showing the outline of the overall construction of an anti-skid braking system (hereinafter abbreviated as "ABS") to which the method of the present invention can be applied.

FIG. 1 illustrates the outline of an anti-skid braking system (ABS) of a vehicle. A motor direct-drive hydraulic unit (HU) 10 is interposed between respective brakes 3-6 for front and rear, left and right wheels 1L,1R,2L,2R and a master cylinder 9 driven by a brake pedal 8. The wheels 1L,1R,2L,2R are provided with wheel speed sensors 21,22,23,24, respectively, a steering 7 with a steering angle sensor 25, and a vehicle body with an acceleration sensor (longitudinal G sensor) 26 for the detection of an acceleration in a longitudinal direction. These sensors 21-26 and hydraulic unit 10 are connected to an electronic control unit (ECU) (30). The ABS according to this embodiment is applied to a front-wheel-drive vehicle so that the rear wheels serve as non-driven wheels.

Figure 2:
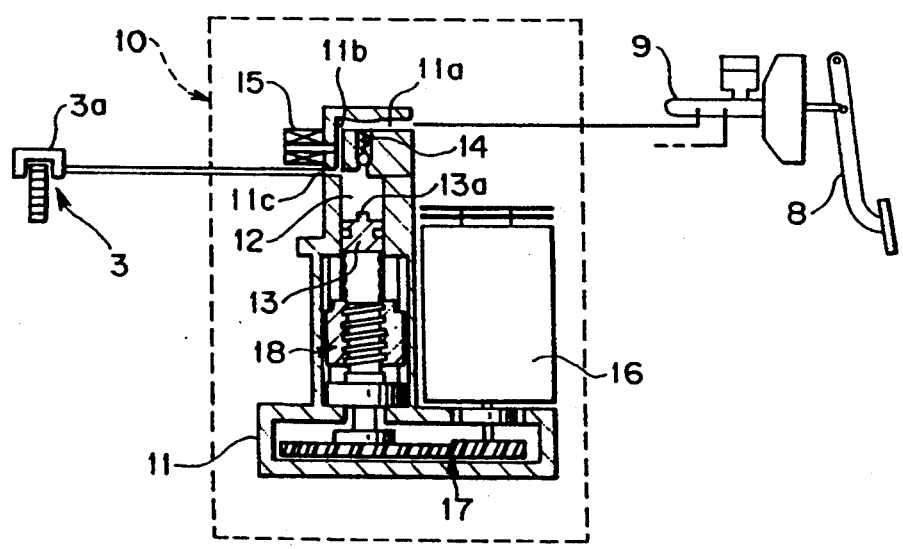
FIG. 2 is a hydraulic circuit diagram illustrating in more detail the construction of a hydraulic unit (HU) 10 shown in FIG. 1.

The hydraulic unit 10, as is shown in FIG. 2, has a cylinder 12 formed on a housing 11. A piston 13 is slidably fitted in the cylinder 12. In an upper part of the housing 11, passages 11a–11c are provided above the cylinder 12. An ABS check valve 14 is disposed between the passage 11a and the passage 11c, while an ABS cut-off valve 15 is arranged in the passage 11b provided alongside the check valve 14. The check valve 14 allows brake fluid to flow from a side of the passage 11c to a side of the passage 11a, and the cut-off valve 15 opens or closes the passage 11b. When the piston 13 reaches its upper-limit position, the check valve 14 is opened against spring force by a pin 13a disposed on an upper end wall of the piston 13.

The housing 11 is provided with a motor 16. Drive torque of the motor 16 is transmitted to the piston 13 via a gear train 17 and a feed mechanism 18, whereby the piston 13 is driven. The motor 16, when rotated in a normal direction, rotates the feed mechanism 18 via the gear train 17 so that the piston 13 is caused to move upward. When reversed, the motor 16 however causes the piston 13 to move downward. The passage 11a in the housing 11 is connected to the master cylinder 9, whereas the passage 11c is connected to a wheel cylinder 3a of the brake 3. It is to be noted that the hydraulic unit 10 is shown only between the brake 3 for the front wheel 1L on one side of the vehicle and the master cylinder 9.

During braking, the electronic control unit 30 receives signals from the wheel speed sensors 21-24, the steering angle sensor 25 and the longitudinal acceleration (G) sensor 26 to predict how much the wheels 1L,1R,2L,2R would slip. To avoid locking of these wheels, the electronic control unit 30 controls the ABS cut-off valve and the motor 16 and hence braking forces of the brakes 3-6. Described more specifically, when one or more of the wheels are expected to lock, each associated piston 13 is caused to move downward to decrease the pressure of the brake fluid to avoid such locking. When the danger of wheel locking is avoided, the piston 13 is allowed to move upward to again increase the pressure of the brake fluid. Such control is repeated so that the pressure of the brake fluid to be applied to the wheel cylinder 3a is controlled.

Procedures of ABS Control

A description will next be made of the procedures of the ABS control, which procedures are performed by the electronic control unit 30 of the ABS.

Figure 3:
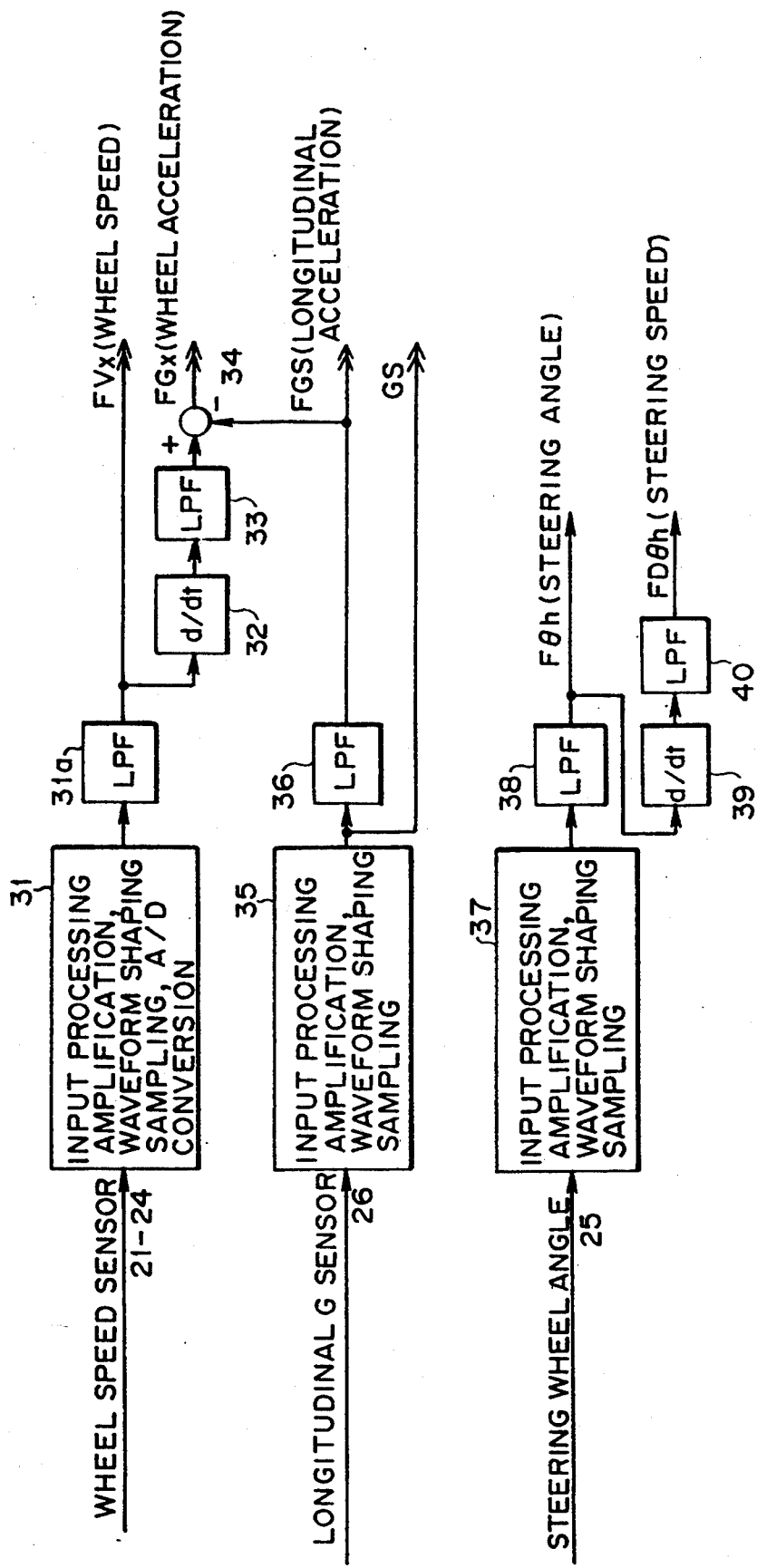
FIG. 3 is a functional block diagram of input signal processing by an electronic control unit (ECU) 30 shown in FIG. 1.
Figure 4:
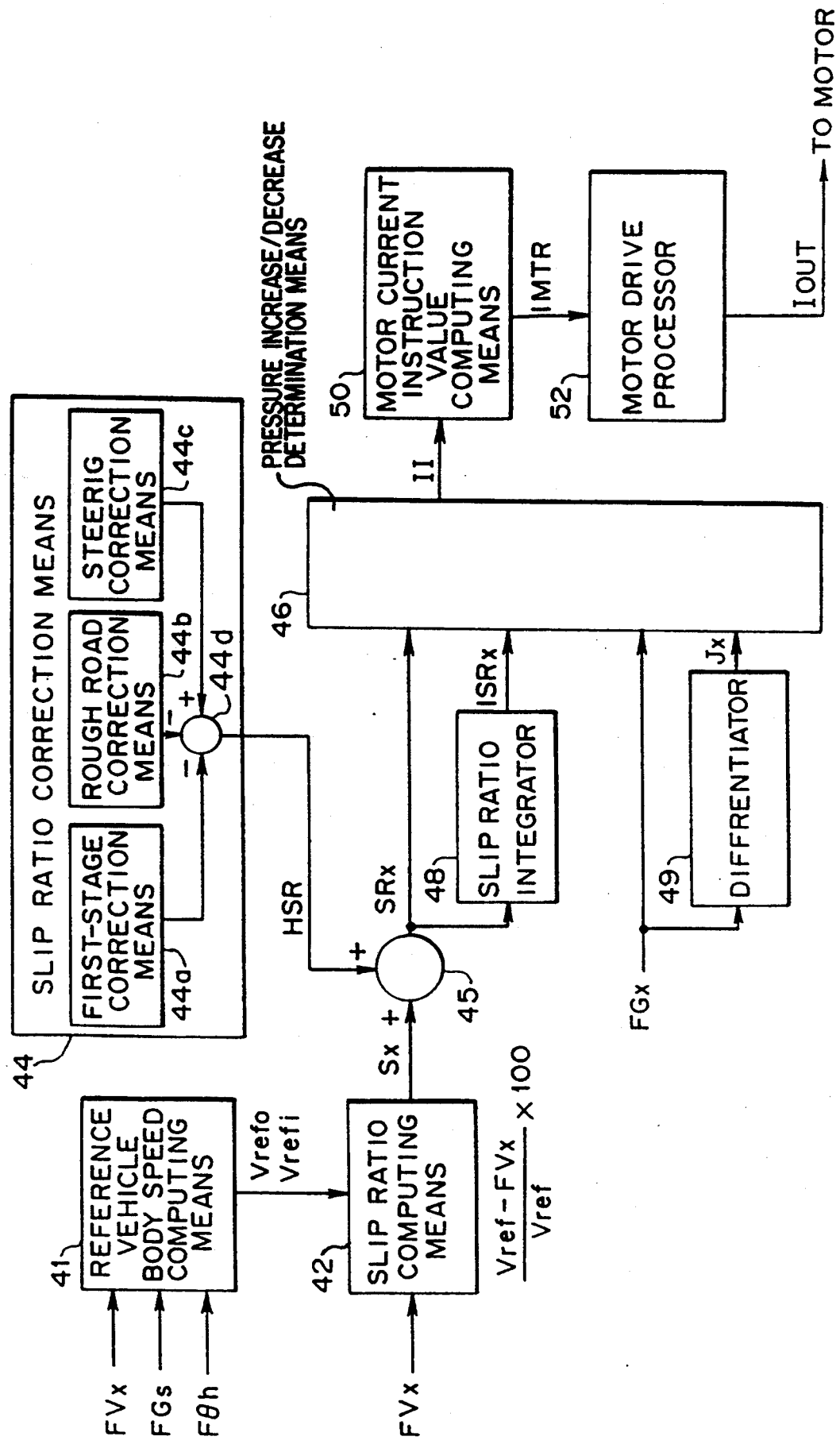
FIG. 4 is a functional block diagram of ABS control by the electronic control unit (ECU) 30 shown in FIG. 1.

FIGS. 3 and 4 show the functional block diagrams corresponding to the ABS control performed by the electronic control unit 30. These functional block diagrams will hereinafter be described with reference to the flow chart of the ABS main routine shown in FIG. 5.

ABS Main Routine

First, input signals detected by various sensors are processed by the sensor signal processors shown in FIG. 3 (Step S1). Wheel speed signals from the wheel speed sensors 21-24 are subjected to processing such as amplification, waveform processing, sampling and A/D conversion by the input processor 31 and, after high-frequency components are cut off by a filter 31a, are outputted as wheel speeds FVx of the respective wheels. The outputs from the filter 31a are also delivered to a differentiator 32, where wheel accelerations of the respective wheels are computed. High-frequency components of these values are cut off by a low-pass filter 33 and, after being corrected at correction means by a longitudinal acceleration FGS detected by the longitudinal G sensor 26 to be described subsequently herein, are outputted as wheel accelerations FGx of the respective wheels. Here, it is to be noted that the suffix "x" as used in the wheel speeds FVx and the wheel accelerations FGx (also in the below-described slip ratios Sx of the respective wheels) represents the right front wheel 1R, the left front wheel 1L, the right rear wheel 2R and the left rear wheel 2L and also that, when wheel speeds and the like are referred to along with the suffix "x", the values of the respective wheels are separately computed.

The detection signal from the longitudinal G sensor 26 is subjected to processing such as amplification, waveform processing, sampling and the like by the input processor 35 and is then outputted as a raw datum GS of the longitudinal acceleration. In addition, the output of the input processor 35 is also fed to a low-pass filter 36 and, after its high-frequency component is cut off there, is also outputted as a filtered value FGS.

The detection signal from the steering angle sensor 25 is subjected to processing such as amplification, waveform processing and sampling by the input processor 37 and, after filtered by a low-pass filter 38, is outputted as a steering angle Fθh. This steering angle Fθh is differentiated with respect to time by a differentiator 39 and, after filtered by a low-pass filter 40, is outputted as a steering speed FDθh.

The wheel speed FVx, longitudinal vehicle body acceleration FGS and steering angle Fθh, which have been subjected to the signal processing as described above, are next supplied to a reference vehicle body speed computing means 41 shown in FIG. 4, so that a reference vehicle body speed Vref is computed (Step S2). If the automotive vehicle is making a quick turn at this time and the absolute value of the steering angle Fθh is large, the reference vehicle body speed Vrefo of the outer wheels and the reference vehicle body speed Vrefi of the inner wheels are computed by correcting differential radii prescribed by the front and rear wheels during cornering. Although the vehicle speed on the side of the outer wheels and that on the side of the inner wheels differ from each other due to the differential radii, the slip ratio of each wheel can be correctly determined by correcting the difference in vehicle speed due to the differential radii.

The reference vehicle body speed Vref (Vrefo and Vrefi) computed by the reference vehicle body speed computing means 41 is supplied to slip ratio computing means 42 so that, based on the wheel speed FVx of each wheel and the reference vehicle body speed Vref, the slip ratio Sx of each wheel is computed in accordance with the following formula (S1) (Step S3):

$$Sx = (Vref - FVx)/Vref \times 100 \qquad (S1)$$

Slip ratio correcting means 44 is constructed of first-stage correction means 44a, rough road correction means 44b, steering correction means 44c and adder 44d. Correction values computed at these correction means 44a–44c are added at the adder 44d. Using added values HSR, the above slip ratios Sx are corrected (Step S4). These corrections are to prevent actuation of the ABS, for example, upon riding over a bump, to improve braking force and directional stability on a rough road and also to improve steerability upon making a quick turn.

Pressure increase/decrease determination means 46 is supplied with a slip ratio SRx corrected by the slip ratio correction means, an integral ISRx of the slip ratio SRx, a wheel acceleration FGx of each wheel, and a differential Jx of the wheel acceleration. It is then determined by fuzzy inference or the like whether the braking pressure is increased or not (Step S5). The computation of the integral ISRx is executed by a slip ratio integrator 48, while the computation of the differential Jx is performed by a differentiator 49.

Figure 6:
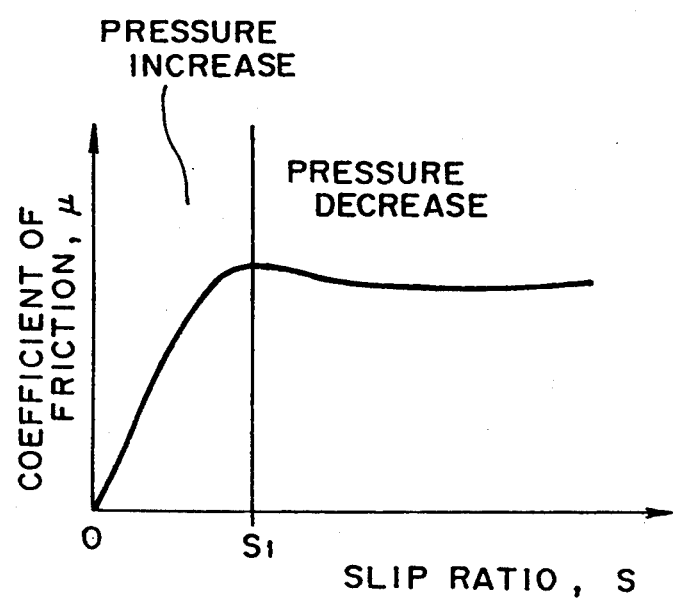
FIG. 6 is a graph illustrating a relationship between a slip ratio S and a friction coefficient $\mu$.

FIG. 6 shows the relationship between the slip ratio S and the friction coefficient μ. As a general method of control by an ABS, based on the relationship between the slip ratio S and the friction coefficient μ and the wheel acceleration FGx, the pressure of brake fluid is increased when the slip ratio S is smaller than a value at which the friction coefficient becomes the greatest or tends to become smaller than the value S1, but is decreased when the slip ratio S is greater than the value S1 or tends to become greater than the value S1. Use of the wheel acceleration FGx alone, however, may result in the situation that the completion of control to lower the pressure would be delayed due to a delay in phase of the filter system for the sensors. To avoid this situation, it is designed to detect, in an earlier stage, any trend toward restoration of a higher wheel speed. It is also designed to detect, in an earlier stage, each extremely low μ-road from the integral ISRx of the slip ratio SRx and also each move toward a high μ-road from a low μ-road so that optimization of brake fluid pressure is ensured.

The results of determination of an increase or decrease at the pressure increase/decrease determination means 46 are outputted as a motor drive target value II to motor current instruction value computing means 50. The computing means 50 computes a motor drive current IMTR in accordance with prescribed procedures. Based on the thus-computed value IMTR, a motor drive processor 52 then outputs a drive current $I_{OUT}$ for the motor 16 of the hydraulic unit (HU) 10 (Step S6). In accordance with a change and positive/negative of the computed value IMTR, the motor drive processor 52 controls to an optimal value the drive current $I_{OUT}$ to be supplied to the motor 16.

Correction of Slip Ratio

Figure 5:
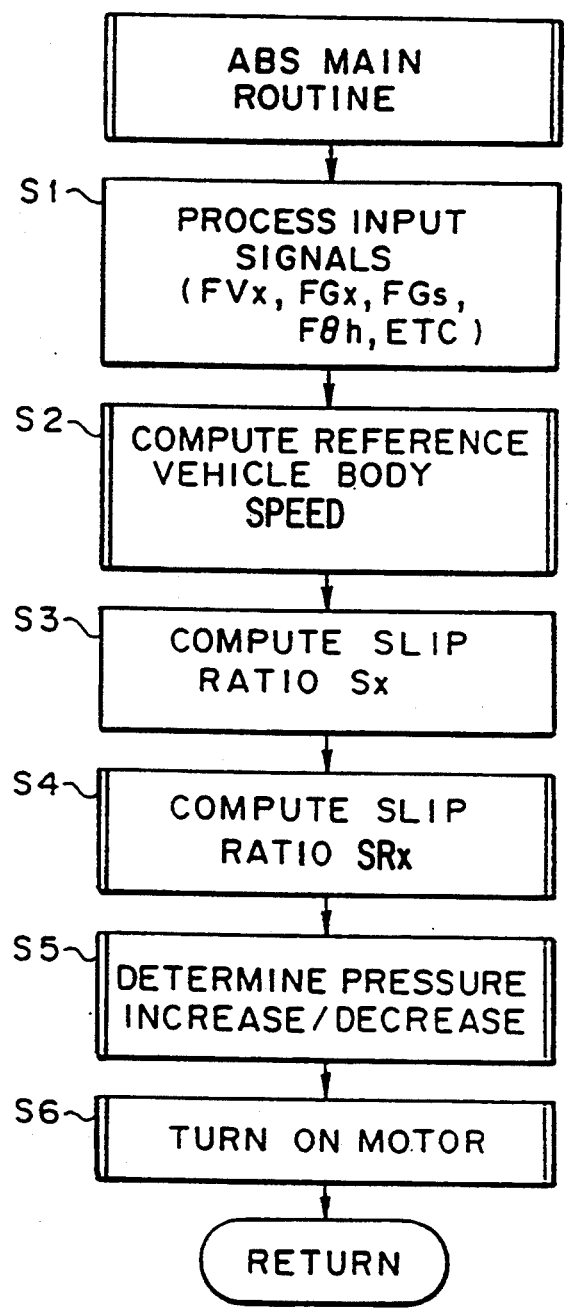
FIG. 5 is a flow chart of a main routine, illustrating procedures of the ABS control, which are performed by the electronic control unit (ECU) shown in FIG. 1.

The contents of Step S4 of FIG. 5 relating to the method of this invention, that is, the procedures of correction of a slip ratio performed by the electronic control unit 30 will next be described in detail with reference FIG. 7.

The electronic control unit 30 first determines in Step S40 whether the automotive vehicle is under the control of the ABS. If the results of the determination are "No", the steering correction value HSTR is set at the value "0" in Step S41, followed by the computation of the first-stage correction value HOFF (Step S42). Upon riding over a bump or the like, the wheel speed is temporarily reduced so that the wheel tends to behave as if it is locked. To avoid actuation of ABS control in such a case, the first-stage correction value HOFF corresponding to the reference vehicle body speed Vref is set. The slip ratio Sx computed by the above-described formula (S1) is corrected to a smaller value by the first-stage correction value HOFF, whereby the initiation of the decrease of the brake fluid pressure is delayed..

Figure 8:
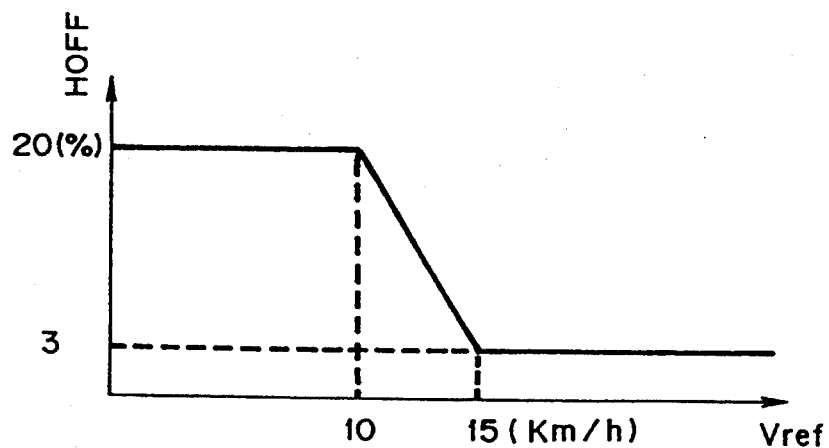
FIG. 8 is a graph depicting a relationship between a reference vehicle body speed Vref and a first-stage correction value HOFF set by the reference vehicle body speed.

FIG. 8 illustrates the relationship between the reference vehicle body speed Vref and the first-stage correction value HOFF set depending on the value of the reference vehicle body speed. When a wheel rides over a bump, the wheel speed drops by about 2–3 km/hr. When the reference vehicle body speed Vref is lower than a predetermined speed (i.e., 15 km/h in FIG. 8), the negative corrections value for the drop is set greater than that for high speeds and, as the influence of rideover of a bump can be practically ignored when the reference vehicle body speed Vref exceeds the predetermined speed, the correction value is set at a value as small as 3% or so.

When the results of the determination in Step S40 are "Yes", that is, when the automotive vehicle is under the control of the ABS, on the other hand, the first-stage correction value HOFF is set at the value "0" in Step S43 and computation of the steering correction value HSTR is then performed (Step S44). This steering correction value corrects the slip ratio Sx to a greater value. This correction is to enhance the control sensitivity of the anti-skid brakes, in other words, the sensitivity at which braking force is decreased.

Figure 10:
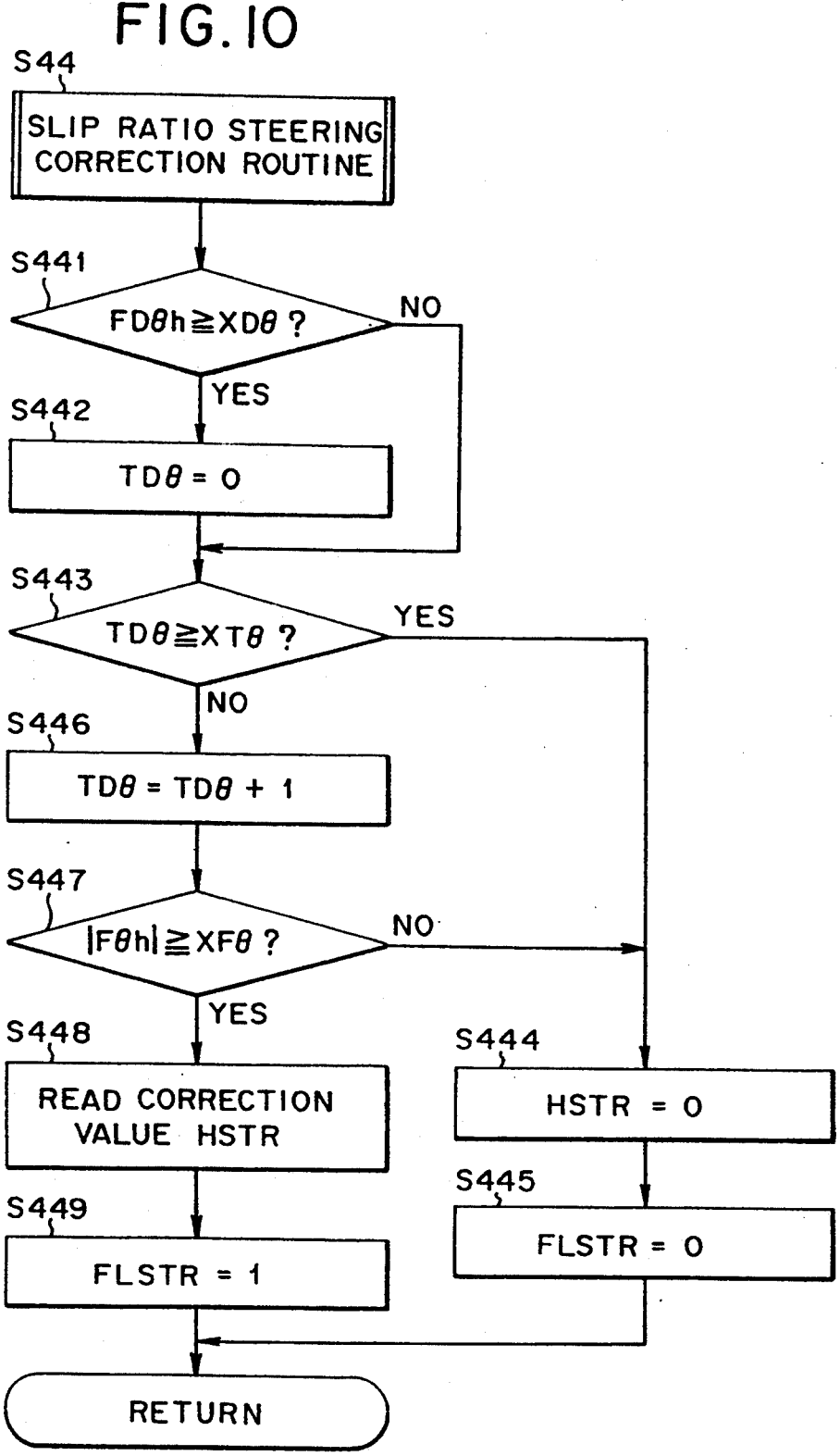
FIG. 10 is a flow chart illustrating the procedures of computation of a steering correction value for a slip ratio, which is performed by the electronic control unit (ECU) shown in FIG. 1.

FIG. 10 illustrates the procedures of computation of the steering correction value HSTR. The electronic control unit 30 first determines whether steering speed FDθh is greater than or equal to the prescribed threshold XDθ, that is, whether the steering wheel has been quickly operated, for example, to avoid an obstacle (Step S441). The threshold XDθ is set at an appropriate value so that the driver's intention of quick steering can be determined. It is preferred to set this threshold XDθ at different values, one for the situation that the steering speed FDθh is increasing and the other for the situation that the steering speed FDθh is decreasing. Setting of the threshold at such different values makes it possible to prevent hunching of the control.

When the results of determination in Step S441 are "No", it is then determined whether the count value of a delay timer TDθ is greater than or equal to predetermined value XTθ (for example, a value corresponding to 1 second) (Step S443). The correction value HSTR is set at "0" in Step S444 and, while a flag FLSTR is kept reset at the value "0" in Step S445, the routine is finished. Incidentally, the flag FLSTR is a program control variable.

When the results of the determination in Step S441 are "Yes", on the other hand, the count value of the delay timer TDθ is reset to "0" in Step S442 and the routine then advances to Step S443. When the state of the quick steering continues, the determination results of "Yes" continue in Step S441. Whenever this occurs, the count value of the delay timer TDθ is reset to "0" in Step S442.

When the results of the determination in Step S443 is "No", that is the count value of the delay time TDθ has not reached the predetermined value XTθ (1 second), the count value TDθ is advanced by the value "1" in Step S446 and the routine then advances to Step S447. In this step, it is determined whether the absolute value of the steering angle Fθh is greater than or equal to a predetermined threshold XFθ, that is, whether the steering wheel has been operated substantially. The threshold XFθ is set at an appropriate value so that the driver's operation over a large steering angle can be determined This threshold XFθ can also be set at different values, one for the situation that the steering angle Fθh is increasing and the other for the situation that the steering angle Fθh is decreasing, so that hysteresis characteristics can be given.

Figure 9:
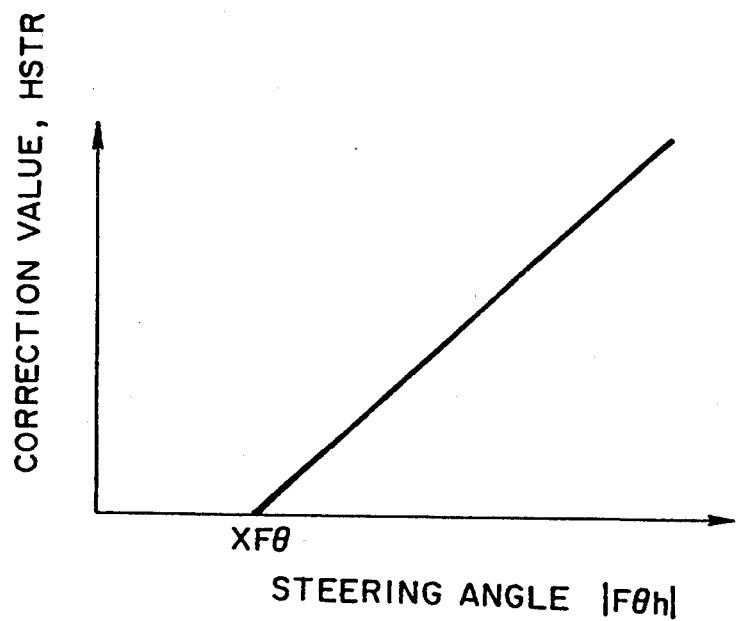
FIG. 9 is a graph showing a relationship between the absolute value F$\theta$h of a steering angle and a steering correction value HSTR set by the absolute value.

When the results of the determination in Step S447 are "No", the steering correction value HSTR is set at the value "0" in the above-described Step S444 and, in Step S445, the flag FLSTR is reset at the value "0" to finish the routine. When the results of the determination in Step S447 is "Yes", in other words, in the case of quick steering and a large steering angle, on the other hand, the routine then advances to Step S448, where the correction value HSTR is read from a map stored in a built-in memory of the electronic control unit 30. FIG. 9 illustrates the relationship between the steering angle Fθh and the correction value HSTR read in accordance with the value of the steering angle Fθh. In a region where the absolute value of the steering angle Fθh is greater than the predetermined threshold XFθ, the correction value Fθh is set at a value corresponding to the steering angle Fθh. The routine then advances to Step S449 and the flag FLSTR is set at the value "1", whereby the routine is finished.

When it is determined in Step S443 that the count value of the delay time TDθ has reached the predetermined value XTθ (1 second) or when it is determined in Step S447 that the absolute value of the steering angle Fθh is smaller than the predetermined threshold XFH, the above-described Steps S444 and S445 are executed again so that the correction value HSRT is set at the value "0" and the flag value FLSRT is reset to "0".

By correcting the slip ratio Sx of each of the front and rear wheels on the basis of the steering correction value STR computed as described above, the degree of a reduction in the brake fluid pressure can be controlled adequately, leading to an improvement in the turning performance. Incidentally, the flag FLSTR is used in the computation of a rough road correction value as will be described subsequently herein.

Figure 7:
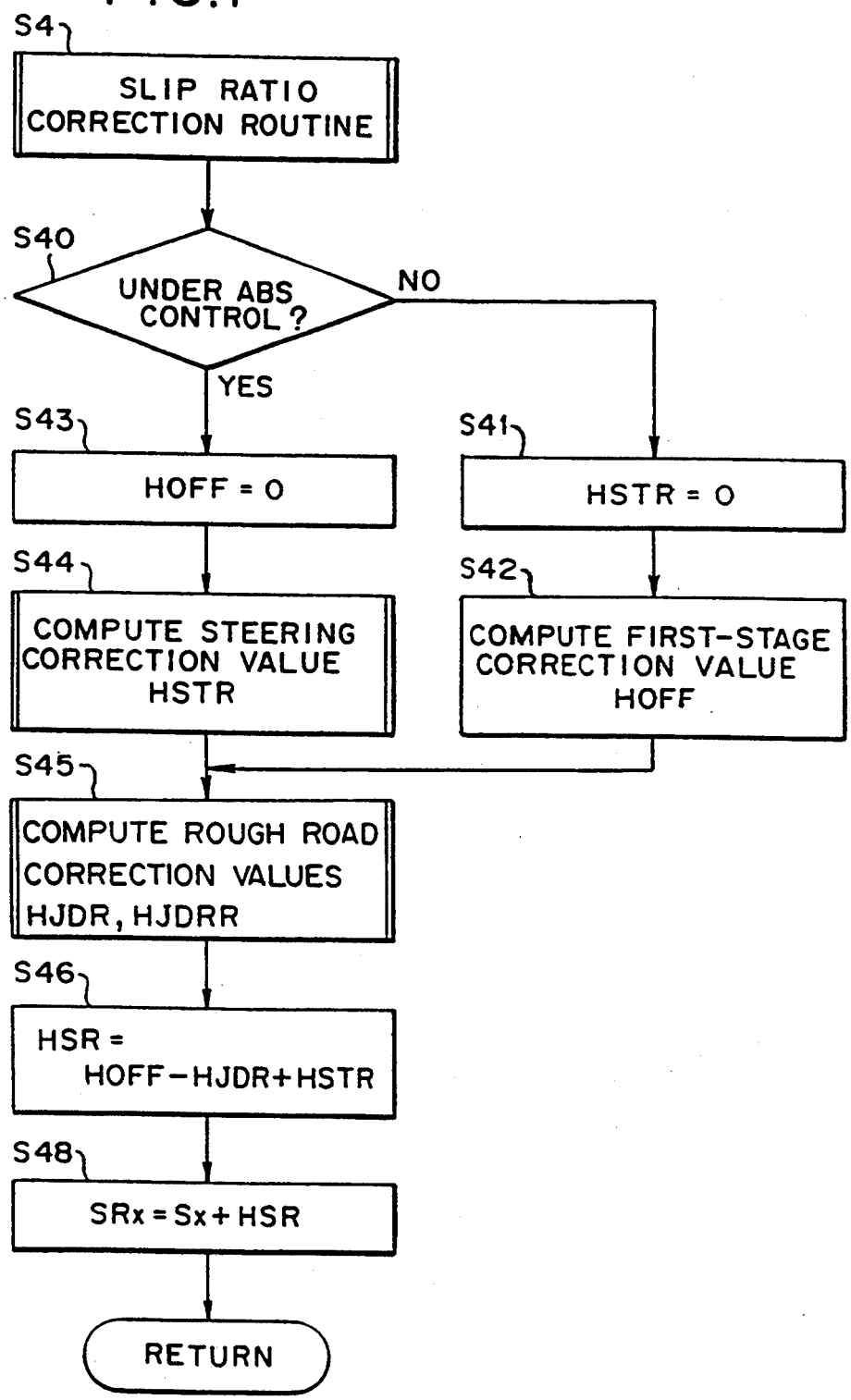
FIG. 7 is a flow chart showing the procedures of computation of a slip ratio correction value, which is performed by the electronic control unit (ECU) shown in FIG. 1.

When the computation of the first-stage correction value HOFF and the steering correction value HSTR is completed, Step S45 shown in FIG. 7 is then executed to compute the rough road correction value HJDR. This 10 rough road correction value HJDR is to correct the slip ratio Sx to a smaller value, so that the control sensitivity of the anti-skid brake, namely, the sensitivity at which the braking force is to be reduced can be lowered.

Figure 11:
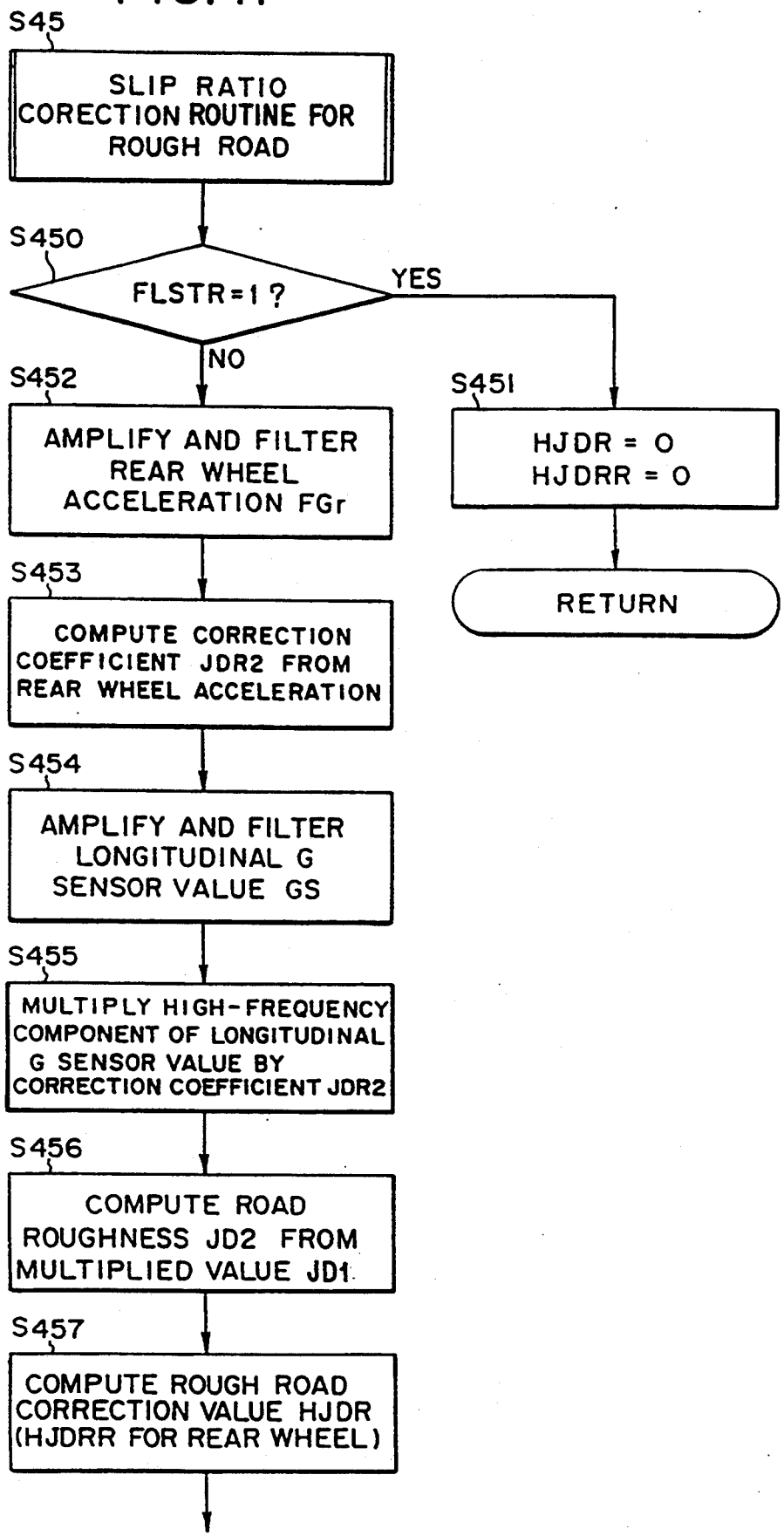
FIG. 11 is a flow chart showing the procedures of computation of a rough road correction value for a slip ratio, which is performed by the electronic control unit (ECU) shown in FIG. 1.

FIG. 11 illustrates procedures for the computation of a rough road correction value for a slip ratio. These procedures will be described in detail with reference to the functional block diagram of FIG. 12.

To improve braking force on a rough road, it is known to preferably control the braking force in such a way that the slip ratio of each wheel is increased to decelerate the wheel. The longitudinal G sensor 26 can detect not only any longitudinal acceleration of the vehicle but also any large vertical vibrations. Vertical vibrations are therefore detected by the longitudinal G sensor 26 while running on a road and, when the road is determined to be rough from the vertical vibrations so detected, the slip ratio is controlled to 100% to brake the wheel in a locked state. It is however to be noted that the longitudinal G sensor 26 may detect vertical vibrations even when not running on a rough road, for example, in an initial stage of deceleration. Control of the slip ratio to 100% in such a case makes it impossible to perform ABS control. When it is desired to 10 detect a rough road by the longitudinal G sensor 26, filtering is therefore conducted based on the wheel acceleration FGx of each rear wheel and the longitudinal acceleration FGS in order to ensure the accuracy of the detection. Incidentally, with a view to ensuring directional stability and computing the reference vehicle body speed Vref, the slip ratio of each rear wheel, that is, each non-driven wheel is limited to 20% or so.

Figure 12:
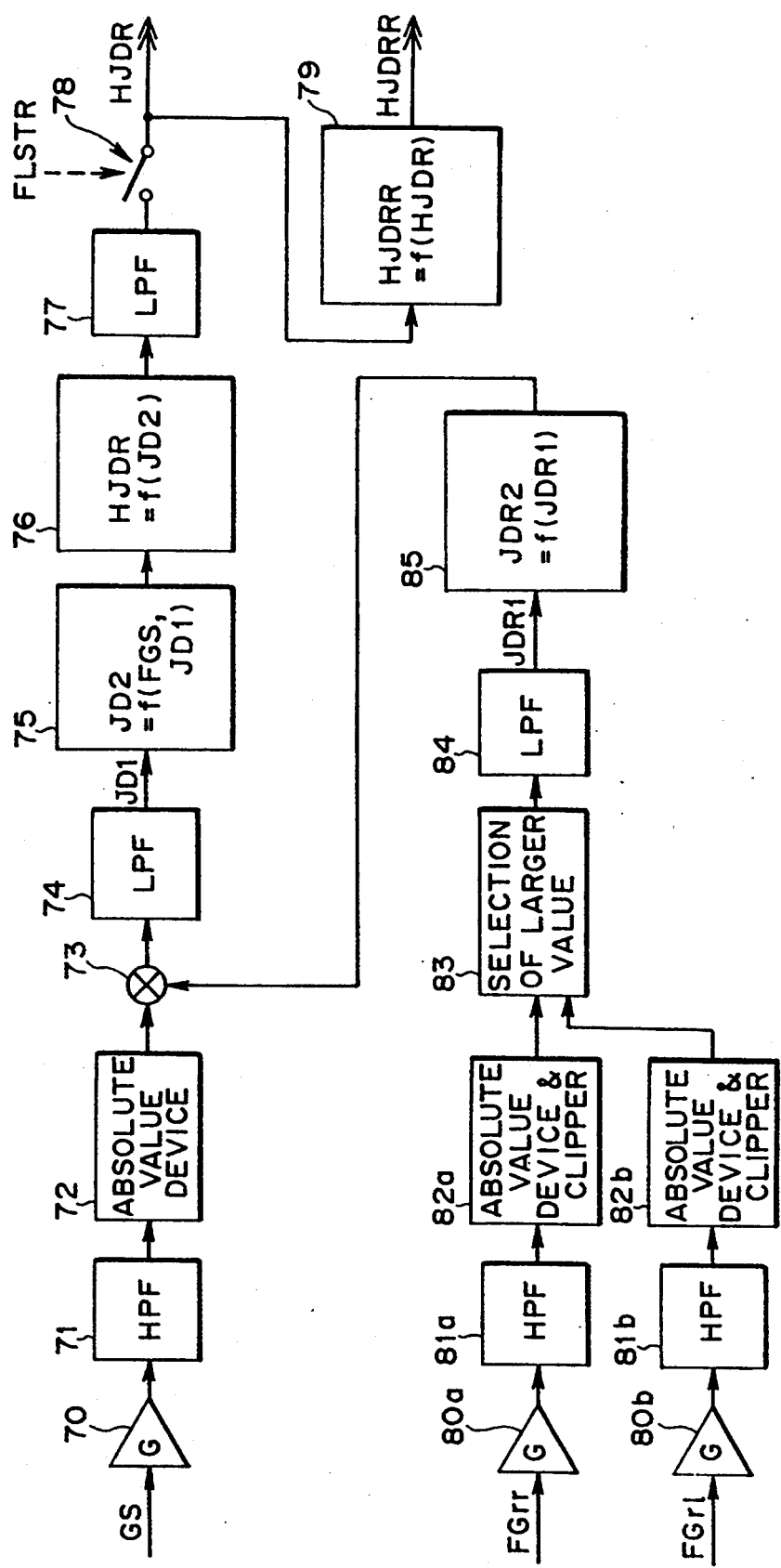
FIG. 12 is a functional block diagram of the electronic control unit 30, which is shown in FIG. 1, for the computation of a rough road correction value for a slip ratio.

This will next be described in further detail. The electronic control unit 30 first determines whether or not the flag FLSTR indicating quick steering and a large steering angle has been set at the value "1". When the results of the determination are "Yes", it is meant that a switch 78 in FIG. 12 is opened, that is, turned off. If this is the case, the routine advances to Step S451. The rough road correction value HJDR for the front wheels and the rough road correction value HJDRR for the rear wheels are each set at the value "0", whereby the routine is finished. The rough road correction is not executed upon turning under quick steering over a large steering angle.

When the results of the determination in Step S450 are "No", on the other hand, the rear wheel acceleration FGr is subjected to signal processing such as amplification and filtering (Step S452) so that the correction coefficient JDR2 is computed (Step S453). Describing this in further detail with reference to the functional block diagram of FIG. 12, wheel accelerations FGrr,FGrl detected from the wheel speed sensors 24,23 for the left and right rear wheels are amplified by amplifiers 80a,80b, respectively. Namely, the gain is set greater when the reference vehicle body speed Vref is slow. Next, only high-frequency components are extracted at high-pass filters 81a,81b, respectively. At signal processors 82a,82b, the absolute values of the signals so extracted are obtained and then clipped to a predetermined upper limit. The greater value of the left and right rough road vibration components subjected to signal processing as described above is selected at a selector 83. After the signal value so selected is subjected to filtering (integration) at a low-pass filter 84 (the above processings are all performed in Step S452), a filter correction coefficient JDR2 corresponding to an output JDR1 from the low-pass filter 84 is computed at a coefficient computing circuit 85.

Figure 14:
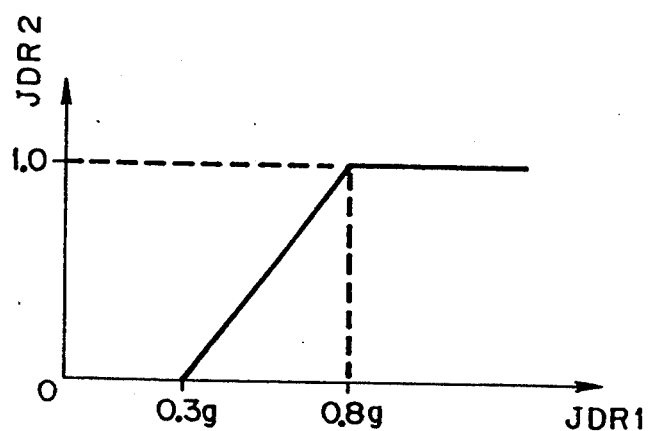
FIG. 14 is a graph showing a relationship between an output JDR1 and a correction coefficient JDR2, which relationship is used when computing a rough road correction value for a slip ratio.

FIG. 14 shows the relationship between the output JDR1 and the correction coefficient JDR2 computed in accordance with the value of the output JDR1. When the output JDR1 is smaller than a predetermined value (e.g., 0.3 g), the filter correction coefficient JDR2 is set at the value "0". When the output JDR1 is greater than a second predetermined value (e.g., 0.8 g), the coefficient is set at the value of "1.0". When the output JDR1 takes a value between the first and second predetermined values, the coefficient is set at a value between "0" and "1.0" in proportion to the output value JDR1. When it is desired to detect a rough road from the high-frequency component JDR1 of the wheel acceleration, no road is determined to be a rough road when the output JDR1 is equal to or less than the first predetermined value as described above so that the filter correction coefficient JDR2 is set at "0" (Step S453). The coefficient JDR2 set as described above is fed to a multiplier 73 and is multiplied plied with a signal value of the vertical vibration component detected by the G sensor 26. It is hence possible to exclude vertical vibrations induced by reasons other than a rough road.

Figure 13:
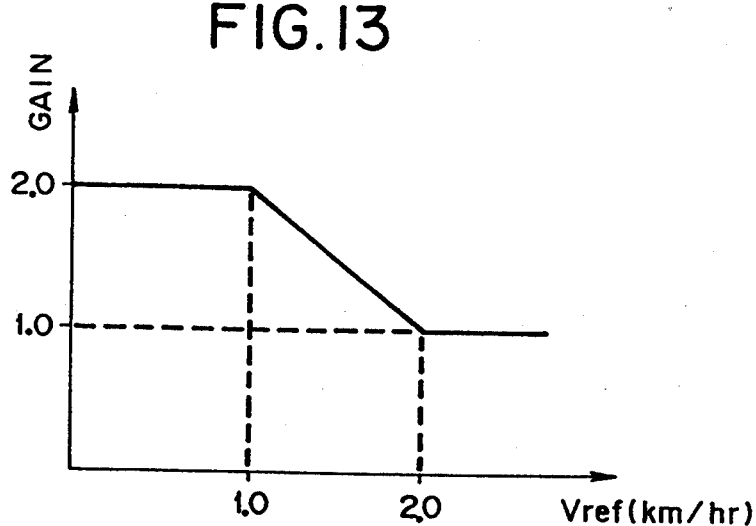
FIG. 13 is a graph illustrating a relationship between a reference vehicle body speed Vref and a gain set by the reference vehicle body speed, which relationship is used when computing a rough road correction value for a slip ratio.

After the completion of the computation of the correction coefficient JDR2, the routine advances to Step S454 in FIG. 11 to perform signal processing such as amplification and filtering of the raw datum GS of the longitudinal acceleration detected by the longitudinal G sensor 26. Described in more detail, the longitudinal acceleration GS detected by the longitudinal G sensor 26 is amplified by an amplifier 70 (FIG. 12). A gain which is used here is set from the reference vehicle body speed Vref in accordance with FIG. 13. FIGS. 18A through 21B illustrate the waveform of the longitudinal G sensor 26 and the waveforms of signals processed at the individual signal processors depicted in FIG. 12, in which FIGS. 18A, 19A, 20A and 21A show the processed waveforms of signals obtained on a non-rough road while FIGS. 18B, 18B, 20B and 21B illustrate the processed waveforms of signals obtained on a rough road. The waveforms of signals outputted from the amplifier 70 are shown in FIGS. 18A and 18B, respectively.

Next, only a high-frequency component is extracted at a high-pass filter 71. By this filtering, a DC component, that is, a longitudinal acceleration component is removed from the signal GS (see FIGS. 19A and 19B). By a signal processor 72, the absolute value of the high-frequency component extracted by the high-pass filter 71 is then obtained (see FIGS. 20A and 20B). After the signal of the absolute value, i.e., the high-frequency component of the signal from the longitudinal G sensor is multiplied by the aforementioned correction coefficient JDR2 at the multiplier 73, the resulting signal is subjected to filtering (integration) at a low-pass filter 74 (see FIGS. 21A and 21B) so that a signal JD1 is obtained (Step S455).

Figure 15:
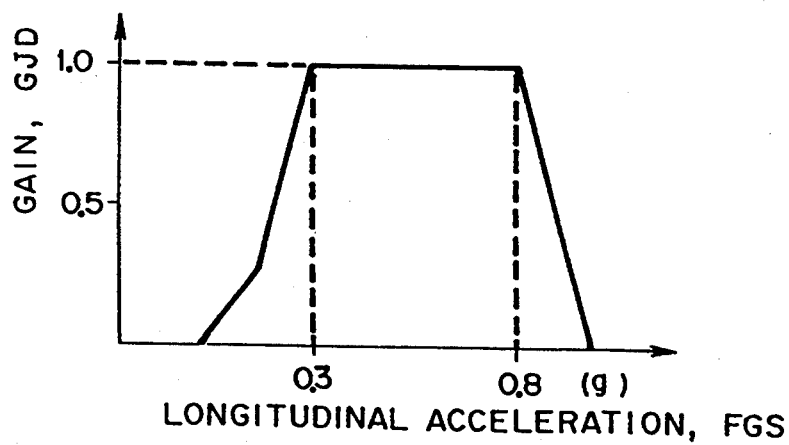
FIG. 15 is a graph showing a relationship between a wheel acceleration FGS and a gain set by the wheel acceleration.

The routine next advances to Step S456 in FIG. 11, where road roughness JD2 is computed in accordance with the following formula (H1) (at road roughness computing means 75 in FIG. 12):

$$JD2 = GJD \times JD1 \tag{H1}$$

where GJD is a gain set based on the longitudinal acceleration FGS and is obtained from the gain GJD-longitudinal acceleration FGS map shown in FIG. 15. Since the longitudinal acceleration FGS detected by the longitudinal G sensor 26 on a rough road is, for example, in the range of 0.3–0.8 g, the gain GJD is set at the value "1.0" when the detected longitudinal acceleration FGS is a value in this range but, when the detected longitudinal acceleration FGS falls outside the above range, is set lower, whereby a rough road can be distinguished.

When the road roughness JD2 is determined, the routine advances to Step S457 and a rough road correction value HJDR for the front wheels is determined based on the road roughness JD2 (at rough road correction value computing means 76 shown in FIG. 12). The rough road correction value HJDR is then subjected to filtering (at a low-pass filter 77 shown in FIG. 12). In some instances, vertical vibrations may not be momentarily detected even on a rough road. If pressure-decreasing control is initiated immediately in such a case, the driver feels idle running. This is not preferred. Any abrupt change in the rough road correction value HJDR is therefore prevented by such filtering as described above.

Figure 16:
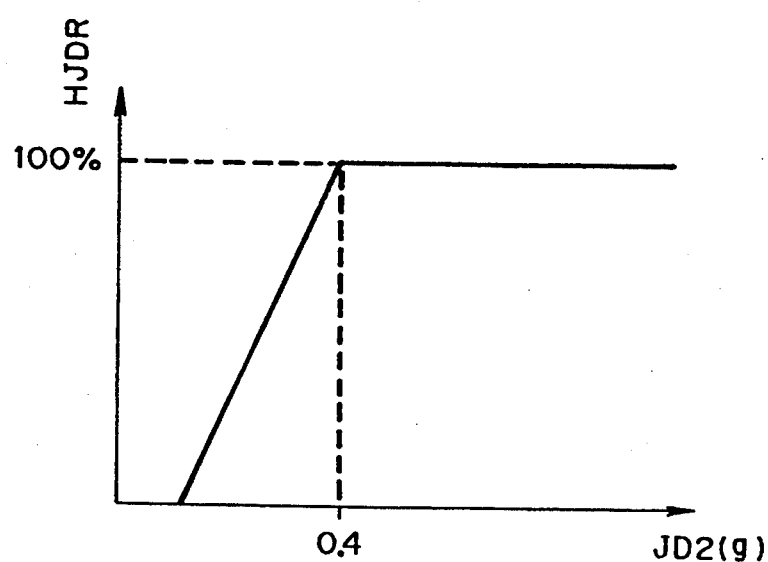
FIG. 16 is a graph showing a relationship between road roughness JD2 and a rough road correction value HJDR set for front wheels by the road roughness.

The rough road correction value HJDRR for the rear wheels is then determined based on the above-determined rough road correction value HJDR for the front wheels (at computing means 79 shown in FIG. 12). FIG. 16 shows the relationship between the road roughness JD2 and the rough road correction value HJDR for the front wheels set in accordance with the value of the road roughness. When the road roughness JD2 is equal to or greater than a predetermined value (for example, 0.4 g), the rough road correction value HJDR is set at 100%. As this rough road correction value HJDR corrects the slip ratio Sx to a smaller value, the slip ratio SRx corrected by the correction value takes an extremely small value when the rough road correction value HJDR is set at 100%, so that the brake fluid pressure for the front wheels is increased on a rough road to ensure substantial deceleration of the front wheels.

Figure 17:
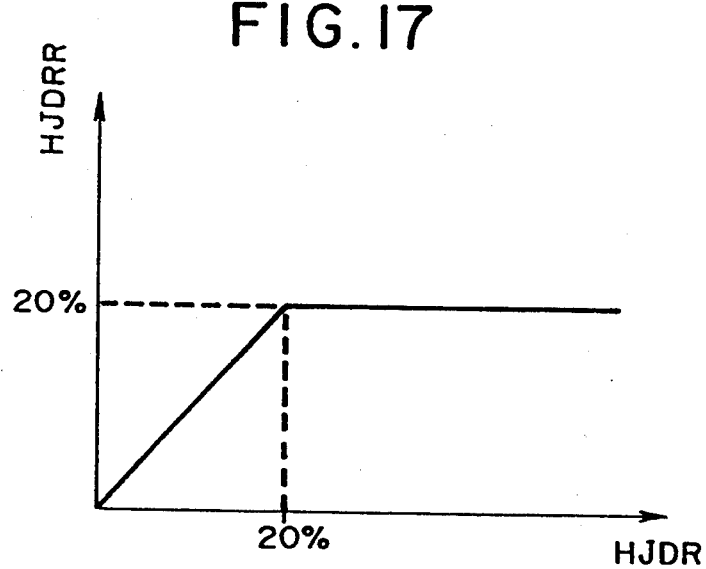
FIG. 17 is a graph showing a relationship between a rough road correction value HJDR for the front wheels and a rough road correction value for rear wheels set by the former rough road correction value.

The rough road correction value HJDRR for the rear wheels, on the other hand, is limited to a value as small as 20% of the rough road correction value HJDR for the front wheels. FIG. 17 illustrates the relationship between the rough road correction value HJDR for the front wheels and the rough road correction value HJDRR for the rear wheels set in accordance with the former rough road correction value. Until the rough road correction value HJDR for the front wheels reaches a predetermined value (for example, 20%), the rough road correction value HJDRR for the rear wheels is set in proportion to the rough road correction value HJDR. When the rough road correction value HJDR for the front wheels exceeds the predetermined value (20%), however, the rough road correction value HJDRR is maintained constant at the predetermined value (20%). This makes it possible to ensure directional stability and also to avoid such inconvenience that the computation of the reference vehicle body speed Vref would become no longer possible.

After completion of the computation of the rough road correction values HJDR,HJDRR, the routine advances to Step S46 in FIG. 7 and the slip ratio correction value HSR is then computed in accordance with the following formula (H2):

$$HSR = HOFF - HJDR + HSTR \quad (H2)$$

The slip ratio Sx computed at the slip ratio computing means 42 and the correction value HSR computed by the slip ratio correction means 44 are then added by an adder 45 (Step S48), whereby the correction routine for the slip ratio is finished.

Figure 22:
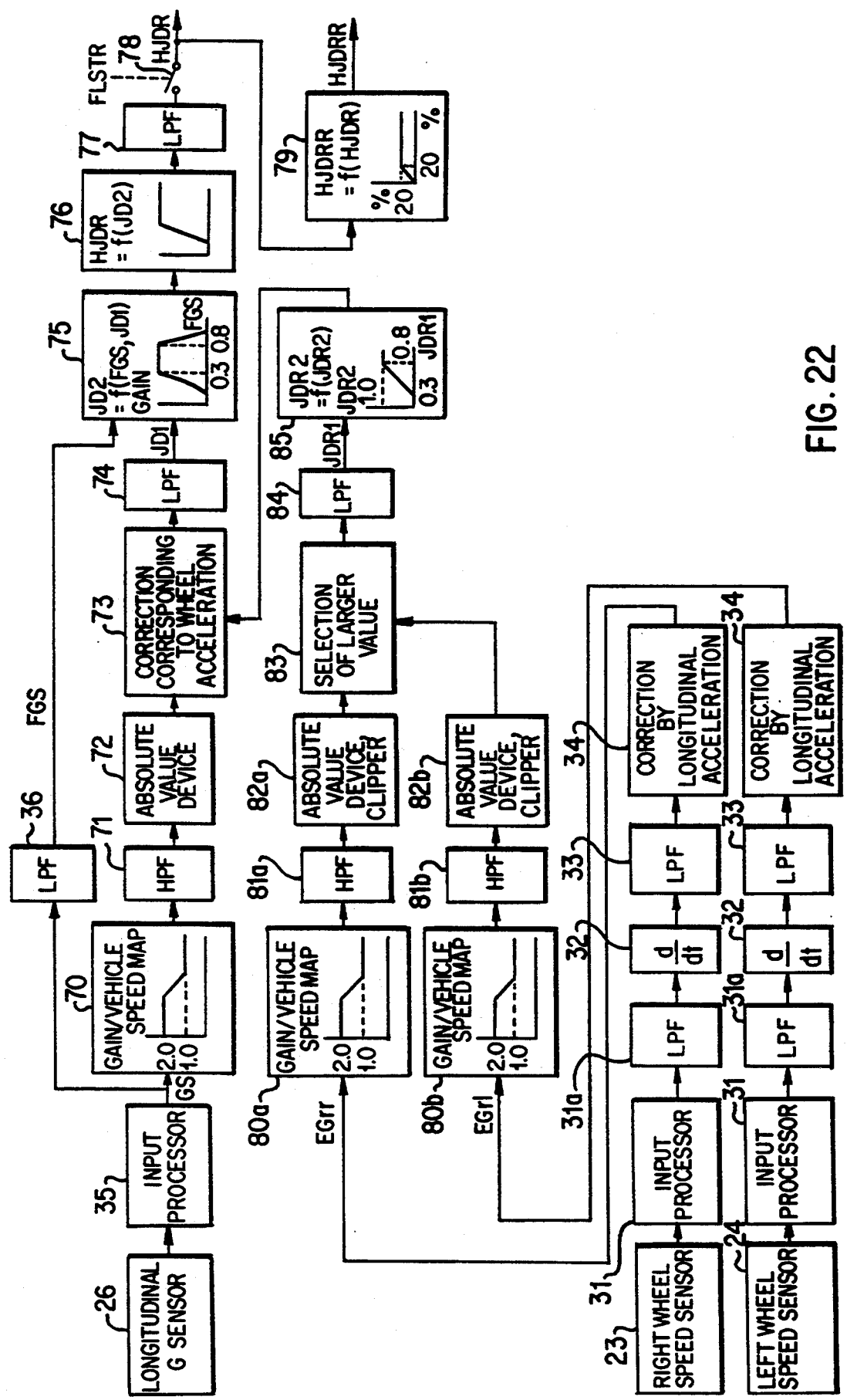
FIG. 22 is a functional block diagram showing the construction of an example in correspondence to the claims.

Incidentally, respective functions relating the rough road correction of the slip ratio as described in the claims of the present invention can be correlated to the corresponding structural units in the above-described embodiment as shown in the functional block diagram of FIG. 22. The blocks identified by various reference numerals in FIG. 22 are similar to the individual blocks designated by similar reference numerals in the functional block diagrams (FIGS. 3, 4 and 12) of the embodiment.

Figure 23:
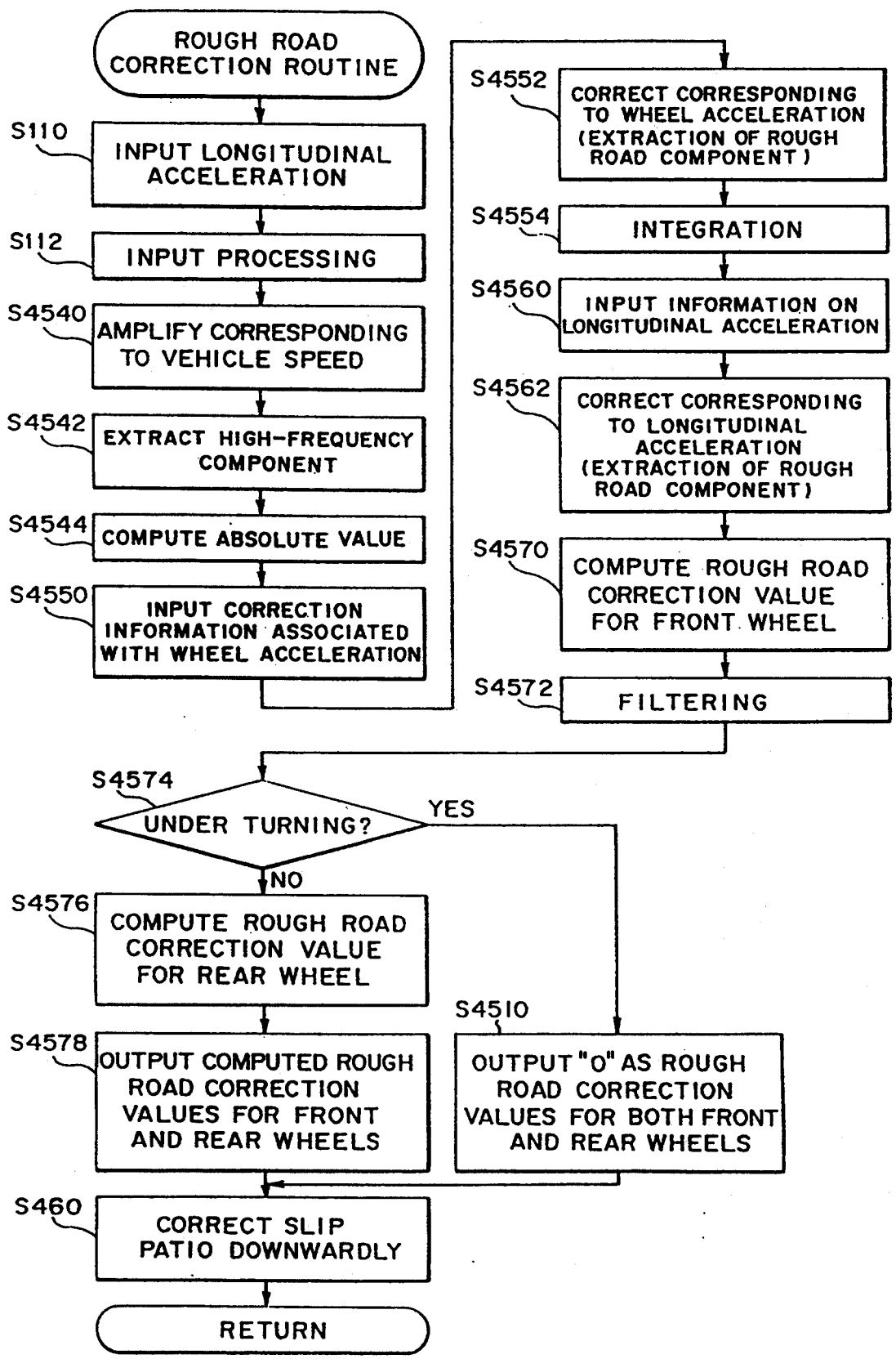
FIGS. 23 through 25 are flow charts showing the construction of the example in correspondence to the claims.

With respect to the rough road correction of the slip ratio performed at these respective functional blocks, the procedures from the input of data to the output of the rough road correction values HJDR,HJDRR can be illustrated, for example, as shown in the flow chart of FIG. 23. Further, the procedures for obtaining the longitudinal acceleration information (FGS) and the wheel acceleration responsive correction information (JDR2), both employed for the rough road correction, can be illustrated, for example, as shown in the flow charts of FIGS. 24 and 25, respectively. In these flow charts, the steps similar in contents to like steps in the flow charts of the embodiment are identified by like reference numerals.

Referring now to the flow chart of FIG. 23, the rough road correction of the slip ratio will be described. First, a longitudinal acceleration datum is inputted from the longitudinal acceleration sensor 26 (Step S110). This longitudinal acceleration datum is subjected to input processing by the input processor (Step S112). These Steps S110,S112 correspond to Step S1 of the above-described main flow chart.

The routine next advances to Step S4540, where the longitudinal acceleration datum is amplified by the amplifier 70 in accordance with a vehicle speed. The routine then advances to Step S4542 and a high-frequency component is extracted by the high-pass filter 71 from the amplified longitudinal acceleration datum. As a result, a vertical acceleration component contained in the longitudinal acceleration datum is extracted. Further, the vertical acceleration component extracted by the signal processor 72 is processed to obtain an absolute value (Step S4544). These Steps S4540 to S4544 correspond to Step S454 in the above-described sub-routine chart. In addition, Step S4540 corresponds to the feature of claim 4, and Step S4542 corresponds to the feature of claim 9.

The wheel acceleration responsive correction information (JDR2) is next inputted (Step S4550) and, at the multiplier 73, the vertical acceleration component which has been processed to the absolute value is multiplied by this correction information (JDR2) (Step S4552). A rough road component of the vertical acceleration is extracted by this correction.

The vertical acceleration is next subjected to integration (filtering) at the low-pass filter 74 (Step S4554), so that the datum JD1 is obtained. These Steps S4550 to S4554 correspond to Step S455 in the above-described sub-routine chart. Steps S4550 and S4554 correspond to the feature of claim 10.

The longitudinal acceleration information (FGS) is then inputted (Step S4560) and, at the rough road computing means 75, the datum JD1 is multiplied by a gain obtained from the map (FIG. 15) or the like on the basis of the longitudinal acceleration information (FGS). As is illustrated in the map (FIG. 15), this rough road JD2 gradually decreases in the range where 10 the longitudinal acceleration FGS is not smaller than the predetermined value (0.8 g) and also gradually decreases in the range where the longitudinal acceleration FGS is not greater than the second predetermined value (0.3 g). These features correspond to those of the third step in claim 1. Further, these Steps S4560 to S4562 correspond to Step S456 in the above-described sub-routine chart.

At the rough road correction value computing means 76, the rough road correction value HJDR for the front wheels is next determined from the map (FIG. 16) or the like on the basis of the road roughness JD2 (Step S4570). Further, this rough road correction value HJDR is subjected to filtering at the low-pass filter 77 (Step S4572).

From the inputted turning information (FLSTR), it is then determined whether the automotive vehicle is turning (FLSTR=1) (Step S4574). If the automotive vehicle is determined to be under turning, "0" is outputted as both the rough road correction value for the front wheels and the rough road correction value for the rear wheels (Step S4510) so that rough road correction is inhibited. These Steps S4574 and S4510 correspond to the features of claim 11.

If the automotive vehicle is determined not to be turning, the rough road correction value JDRR for the rear wheels is determined at the rough road correction computing means 79 from the map (FIG. 17) or the like on the basis of the rough road correction value HJDR for the front wheels (Step S4576). Here, the rough road correction value HJDRR for the rear wheels is limited to 20% or smaller so that the data of revolution speeds of the rear wheels as the driven wheels can be effectively used. This limitation of the rough road correction value HJDRR for the rear wheels in Step S4576 corresponds to the feature of claim 12.

The rough road correction value HJDR for the front wheels and the rough road correction value HJDRR for the rear wheels are then outputted (Step S4578). The above-described Steps S4570 to S4578 correspond to Step S457 in the above-described sub-routine chart.

By the rough road correction value HJDR for the front wheels and the rough road correction value HJDRR for the rear wheels outputted as described above, the slip ratio Sx is corrected to a smaller value (Step S460) so that the sensitivity of the anti-skid brake, namely, the sensitivity at which the braking force is reduced is corrected to a lower side. This Step S460 corresponds to the feature of claim 13.

Figure 24:
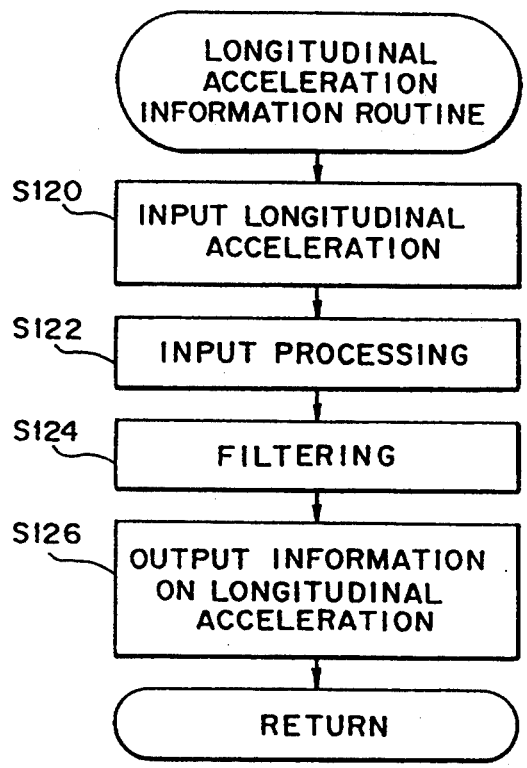
Figure 25:
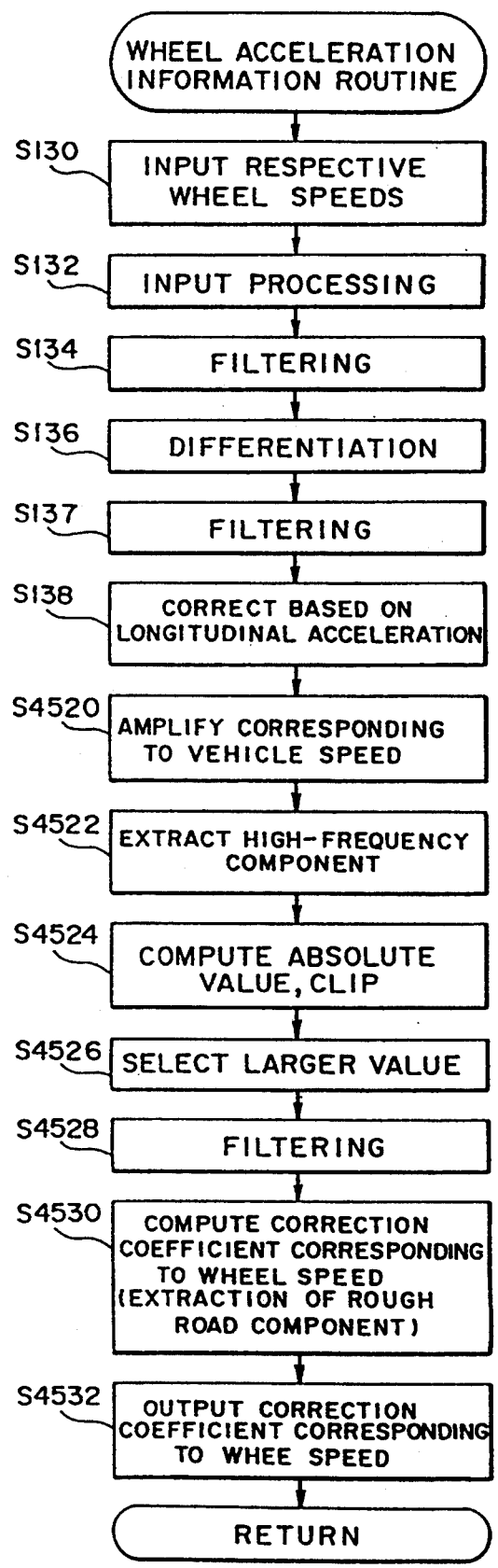

According to the procedures for the computation 10 of the longitudinal acceleration information (FGS), the longitudinal acceleration information is, as shown in FIG. 24, inputted from the longitudinal G sensor 26 (Step S120), subjected to input processing (Step S122) and further to filtering at the low-pass filter 36 (Step S124), and then outputted as the longitudinal acceleration information FGS (S126). These Steps S120 to S126 correspond to Step S1 of the above-described main flow chart. Further, Step S124 corresponds to the feature of claim 2.i According to the procedures for the correction of the wheel acceleration responsive correction information (JDR2), the wheel speed of each of wheels (left and right rear wheels) is, as shown in FIG. 25, inputted (Step S130) and the subjected to input processing (Step S132), to filtering at the low-pass filter 31a (Step S134), to differentiation at the differentiator 32 (Step S136) and further to filtering at the low-pass filter 33 (Step S137). The wheel speeds so processed are corrected based on the longitudinal acceleration datum at the correction means 34 and then outputted as the wheel acceleration FGrr (right wheel) and FGrl (left wheel) (Step 138). These Steps S130 to S138 correspond to Step S1 of the above-described main flow chart.

The routine then advances to Step S4520, where the longitudinal acceleration datum is amplified in accordance with the vehicle speed at the amplifier 70. This Step S4520 corresponds to the feature of claim 7.

The routine advances further to Step S4522, where the high-frequency component is extracted from the thus-amplified longitudinal acceleration datum at the high-pass filter 71. As a result, the vertical acceleration component contained in the longitudinal acceleration datum is extracted. This Step S4522 corresponds to the feature of claim 6.

Further, the vertical acceleration component so extracted is subjected by the signal processor 72 to processing to convert it to an absolute value and also to clipping (Step S4524). This Step S4524 corresponds to the feature of claim 8.

These Steps S4520 to S4524 are performed with respect to each of the left and right wheels. In Step S4526, the greater value is then selected from the left and right wheel accelerations which have been subjected to the absolute value processing and the clipping. The greater one so selected is next subjected to filtering at the low-pass filter 84 (Step S4528). The filter correction coefficient (=wheel speed responsive correction coefficient) JDR2 is obtained from the map 10 (FIG. 14) or the like on the basis of the output JDR1 from the low-pass filter 84 (Step S4530) and is then outputted (Step S4532). This correction coefficient JDR2 is used for the above-described wheel acceleration responsive correction (Step S4552) but, as is shown in the map (FIG. 14), the correction coefficient JDR2 gradually becomes smaller in the range not greater the predetermined value (0.8 g). This feature therefore corresponds to that of the third step in claim 5.

Further, Steps S4520 to S4528 described above correspond to Step S452 in the above-described subroutine chart while Steps S4530 to S4532 described above correspond to Step S453 in the above-described sub-routine chart.

A description will next be made of a correlation between claims 1 and 5 as main claims and the embodiment described above.

Dealing first with claim 1, the first step (the vertical acceleration detection step) corresponds to Steps S110, S112 and S4542 shown in FIG. 23; the second step (the longitudinal acceleration detection step) to Steps S120 to S126 depicted in FIG. 24 and also to Steps S4554 and S4542 shown in FIG. 23; the third step (rough road correction value computing step) to Steps S4562 and S4570 illustrated in FIG. 23; and the fourth step (the control sensitivity lowering step) to Step S460 depicted in FIG. 23.

Turning next to claim 5, the first step (the vertical acceleration detection step) of claim 5 corresponds to Steps S110, S112, S4540 and S4542 shown in FIG. 23; the second step (the longitudinal acceleration detection step) to Steps S120 to S126 shown in FIG. 24 and also to Steps S4554 and S4542 depicted in FIG. 23; the third step (the rough road correction value computing step) to Steps S4520, S4522, S4524, S4526, S4528, S4530 and S4532 illustrated in FIG. 25 and also to Steps S4552 and S4570 shown in FIG. 23; and the fourth step (the control sensitivity lowering step) to Step S460 depicted in FIG. 23.

The anti-skid braking method according to the present invention features the correction of each slip ratio. As to how the pressure of brake fluid should be increased or decreased using the slip ratio computed by the method of this invention, various methods can be applied. In this regard, it is therefore to be noted that the present invention is of course not limited to the embodiment.

In the embodiment, the motor direct-drive hydraulic unit (HU) 10 is disposed in the hydraulic lines between the respective wheel cylinders and the master cylinder so that the brake fluid pressures for the wheel cylinders can be controlled by the unit 10. Needless to say, the present invention is not limited to the use of the hydraulic unit (HU) 10.

What is claimed is:

1. A method for controlling a braking force applied to a wheel of a vehicle based on a detected behavior of the wheel, the method comprising the steps of:

determining a longitudinal acceleration of a body of the vehicle;

determining a vertical acceleration of the vehicle body;

determining a value of road roughness based on the determined vertical and longitudinal accelerations of the vehicle body;

reducing the value of road roughness by a first predetermined amount when the determined longitudinal acceleration of the vehicle body is greater than or equal to a first predetermined value; and reducing the braking force applied to the wheel by a second predetermined amount based on the value of road roughness when the detected wheel behavior indicates a wheel locking condition.

2. A method according to claim 1, further comprising the step of determining a low-frequency value of the longitudinal acceleration of the vehicle body; and wherein the step of determining the value of road roughness is based on the determined vertical acceleration of the vehicle body and on the determined low-frequency value of the longitudinal acceleration of the vehicle body.

3. A method according to claim 1, wherein the value of road roughness is reduced by a third predetermined amount when the determined longitudinal acceleration of the vehicle body is less than or equal to a second predetermined value, and wherein the second predetermined value is less than the first predetermined value.

4. A method according to claim 1, further comprising the step of increasing the value of road roughness by a third predetermined amount when a speed of the vehicle is less than a first predetermined speed.

5. A method according to claim 1, wherein the step of determining the longitudinal acceleration of the vehicle body determines a high-frequency component of the longitudinal acceleration of the vehicle body; and wherein the step of determining a vertical acceleration of the vehicle body is based on the determined high-frequency component of the longitudinal acceleration of the vehicle body.

6. A method according to claim 1, further comprising the step of determining a turning condition of the vehicle; and wherein the steps of determining a value of road roughness, reducing the value of road roughness, and reducing the braking force applied to the wheel based on the value of road roughness are inhibited if a turning condition of the vehicle is determined.

7. A method according to claim 1, wherein if the wheel is a non-driven wheel, the braking force applied to the wheel is reduced by the second predetermined amount, and if the wheel is a driven wheel, the braking force applied to the wheel is reduced by a third predetermined amount, wherein the third predetermined amount is less than the second predetermined amount.

8. A method according to claim 1, wherein the step of reducing the braking force applied to the wheel includes the step of reducing a wheel slip ratio of the wheel by a third predetermined amount, wherein the third predetermined amount corresponds to the second predetermined amount.

9. A method for controlling a braking force applied to a wheel of a vehicle based on a detected behavior of the wheel, the method comprising the steps of:

determining an acceleration of the wheel;

determining a vertical acceleration of a body of the vehicle;

determining a value of road roughness based on the determined vertical acceleration of the vehicle body and the determined acceleration of the wheel;

reducing the value of road roughness by a first predetermined amount when the determined acceleration of the wheel is less than or equal to a first predetermined value; and reducing the braking force applied to the wheel by a second predetermined amount based on the value of road roughness when the detected wheel behavior indicates a wheel locking condition.

10. A method according to claim 9, further comprising the step of determining a high-frequency component of the acceleration of the wheel; and wherein the step of determining the value of road roughness is based on the determined vertical acceleration of the vehicle body and on the determined high-frequency component of the acceleration of the wheel.

11. A method according to claim 9, further comprising the step of increasing the value of road roughness by a third predetermined amount when a speed of the vehicle is less than a first predetermined speed.

12. A method according to claim 9, wherein the step of determining the acceleration of the wheel comprises the steps of:

determining an acceleration of a left wheel of the vehicle;

determining an acceleration of a right wheel of the vehicle; and selecting the greater of the determined accelerations of the left and right wheels.

13. A method according to claim 9, further comprising the step of determining a high-frequency component of a longitudinal acceleration of the vehicle body; and wherein the step of determining the vertical acceleration of the vehicle body is based on the determined high-frequency component of the longitudinal acceleration of the vehicle body.

14. A method according to claim 13, wherein the step of determining a high-frequency component of the longitudinal acceleration of the vehicle body includes the steps of:

determining an absolute value of the high-frequency component of the longitudinal acceleration of the vehicle body; and integrating the determined absolute value of the high-frequency component of the longitudinal acceleration of the vehicle body.

15. A method according to claim 9, further comprising the step of determining a turning condition of the vehicle; and wherein the steps of determining a value of road roughness, reducing the value of road roughness, and reducing the braking force applied to the wheel based on the value of road roughness are inhibited if a turning condition of the vehicle is determined.

16. A method according to claim 9, wherein if the wheel is a non-driven wheel, the braking force applied to the wheel is reduced by the second predetermined amount, and if the wheel is a driven wheel, the braking force applied to the wheel is reduced by a third predetermined amount, wherein the third predetermined amount is less than the second predetermined amount.

17. A method according to claim 9, wherein the step of reducing the braking force applied to the wheel includes the step of reducing a wheel slip ratio of the wheel by a third predetermined amount, wherein the third predetermined amount corresponds to the second predetermined amount.

18. An anti-skid braking system for controlling a braking force applied to a wheel of a vehicle based on a detected behavior of the wheel, the system comprising:

means for detecting the behavior of the wheel;

means for determining a longitudinal acceleration of a body of the vehicle;

means for determining a vertical acceleration of the vehicle body;

means for determining a value of road roughness based on the vertical acceleration and the longitudinal acceleration of the vehicle body;

means for reducing the value of road roughness by a first predetermined amount when the longitudinal acceleration of the vehicle is greater than or equal to a first predetermined value; and means for reducing the braking force applied to the wheel by a second predetermined amount based on the value of road roughness when the detected wheel behavior indicates a wheel locking condition.

19. An anti-skid braking system according to claim 18, wherein the means for determining a longitudinal acceleration of the vehicle body determines a low-frequency value of the longitudinal acceleration of the vehicle body; and the value of road roughness determined by the means for determining the value of road roughness is based on the determined vertical acceleration of the vehicle body and on the determined low-frequency value of the longitudinal acceleration of the vehicle body.

20. An anti-skid braking system according to claim 18, wherein the means for reducing the value of road roughness reduces the value of road roughness by a third predetermined amount when the longitudinal acceleration of the vehicle body is less than or equal to a second predetermined value, and wherein the second predetermined value is less than the first predetermined value.

21. An anti-skid braking system according to claim 18, further comprising means for increasing the value of road roughness by a third predetermined amount when a speed of the vehicle is less than a first predetermined speed.

22. An anti-skid braking system according to claim 18, wherein the means for determining a longitudinal acceleration of the vehicle body determines a high-frequency value of the longitudinal acceleration of the vehicle body; and the vertical acceleration of the vehicle body determined by the means for determining the vertical acceleration of the vehicle body is based on the determined high-frequency value of the longitudinal acceleration of the vehicle body.

23. An anti-skid braking system according to claim 18, further comprising means for detecting a turning condition of the vehicle; and wherein the means for determining a value of road roughness, the means for reducing the value of road roughness, and the means for reducing the braking force applied to the wheel are inhibited when the vehicle is detected to be in a turning condition.

24. An anti-skid braking system according to claim 18, wherein the means for reducing the braking force reduces the braking force applied to the wheel by the second predetermined amount when the wheel is a non-driven wheel, and reduces the braking force applied to the wheel by a third predetermined amount when the wheel is a driven wheel, wherein the third predetermined amount is less than the second predetermined amount.

25. An anti-skid braking system according to claim 18, wherein the means for reducing the braking force includes means for reducing a wheel slip ratio of the wheel by a third predetermined amount, wherein the third predetermined amount corresponds to the second predetermined amount.

26. An anti-skid braking system for controlling a braking force applied to a wheel of a vehicle based on a detected behavior of the wheel, the system comprising:

means for detecting the behavior of the wheel;

means for determining an acceleration of the wheel;

means for determining a vertical acceleration of a body of the vehicle;

means for determining a value of road roughness based on the vertical acceleration of the vehicle body and the acceleration of the wheel;

means for reducing the value of road roughness by a first predetermined amount when the acceleration of the wheel is less than or equal to a first predetermined value; and means for reducing the braking force applied to the wheel by a second predetermined amount based on the value of road roughness when the detected wheel behavior indicates a wheel locking condition.

27. An anti-skid braking system according to claim 26, further comprising means for determining a high-frequency component of the acceleration of the wheel; and wherein the value of road roughness determined by the means for determining the value of road roughness is based on the determined vertical acceleration of the vehicle body and on the determined high-frequency component of the acceleration of the wheel.

28. An anti-skid braking system according to claim 26, further comprising means for increasing the value of road roughness by a third predetermined amount when a speed of the vehicle is less than a first predetermined speed.

29. An anti-skid braking system according to claim 26, wherein the means for determining the acceleration of the wheel comprises:

means for determining an acceleration of a left wheel of the vehicle;

means for determining an acceleration of a right wheel of the vehicle; and means for selecting the greater of the determined accelerations of the left and right wheels.

30. An anti-skid braking system according to claim 26, further comprising means for determining a high-frequency component of a longitudinal acceleration of the vehicle body; and wherein the vertical acceleration determined by the means for determining the vertical acceleration is based on the high-frequency component of the longitudinal acceleration of the vehicle body.

31. An anti-skid braking system according to claim 30, wherein the means for determining the longitudinal acceleration of the vehicle comprises:

means for determining an absolute value of a high-frequency component of the longitudinal acceleration of the vehicle body; and means for integrating the determined absolute value of the high-frequency component of the longitudinal acceleration of the vehicle body.

32. An anti-skid braking system according to claim 26, further comprising means for detecting a turning condition of the vehicle; and wherein the means for determining a value of road roughness, the means for reducing the value of road roughness, and the means for reducing the b-raking force applied to the wheel are inhibited when the vehicle is detected to be in a turning condition.

33. An anti-skid braking system according to claim 26, wherein the means for reducing the braking force reduces the braking force applied to the wheel by the second predetermined amount when the wheel is a non-driven wheel, and reduces the braking force applied to the wheel by a third predetermined amount when the wheel is a driven wheel, wherein the third predetermined amount is less than the second predetermined amount.

34. An anti-skid braking system according to claim 26, wherein the means for reducing the braking force includes means for reducing a wheel slip ratio of the wheel by a third predetermined amount, wherein the third predetermined amount corresponds to the second predetermined amount.

* * * * *